(12) United States Patent
Uchida

(10) Patent No.: US 7,405,864 B2
(45) Date of Patent: Jul. 29, 2008

(54) DIMMING DEVICE AND DISPLAY DEVICE INCORPORATING THE SAME

(75) Inventor: Hideki Uchida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 330 days.

(21) Appl. No.: 10/549,503

(22) PCT Filed: Mar. 9, 2004

(86) PCT No.: PCT/JP2004/003044

§ 371 (c)(1),
(2), (4) Date: Sep. 14, 2005

(87) PCT Pub. No.: WO2004/081645

PCT Pub. Date: Sep. 23, 2004

(65) Prior Publication Data

US 2006/0209381 A1    Sep. 21, 2006

(30) Foreign Application Priority Data

Mar. 14, 2003 (JP) ............................. 2003-069183
Mar. 14, 2003 (JP) ............................. 2003-069232
Mar. 14, 2003 (JP) ............................. 2003-070341

(51) Int. Cl.
*G02B 26/00* (2006.01)
*G02F 1/03* (2006.01)
*G02F 1/15* (2006.01)
*G02F 1/1335* (2006.01)

(52) U.S. Cl. ............... 359/296; 359/297; 359/246; 359/265; 359/267; 349/114; 136/246; 315/149; 423/648.1; 385/131; 257/2

(58) Field of Classification Search ............... 359/296, 359/297, 246, 247, 262, 265, 267, 584, 585; 385/17–19, 130, 131, 141; 349/114; 376/255; 315/149; 348/E5.133; 250/214 VT, 225, 250/290.1, 397, 306, 310; 219/219, 543; 136/246, 247; 423/648.1; 430/59.5, 78, 430/212, 236; 438/758, 795
See application file for complete search history.

(56) References Cited

U.S. PATENT DOCUMENTS 2,531,945 A * 11/1950 Moulton ..................... 359/580

(Continued)

FOREIGN PATENT DOCUMENTS

JP          61-143749          7/1986

(Continued)

OTHER PUBLICATIONS

Official Communication dated Feb. 23, 2006, cited in the corresponding International Application No. PCT/JP2004/003044.

(Continued)

*Primary Examiner*—Loha Ben
(74) *Attorney, Agent, or Firm*—Keating & Bennett, LLP

(57) ABSTRACT

A dimming device is provided by using a material which is capable of transitioning between a metallic reflection state and a transmitting state. The dimming device has a layered structure including a first layer and a second layer, such that the light reflectance of the first layer changes in response to an external stimulation. The first layer contains a first material whose optical characteristics change in accordance with a concentration of a specific element. The second layer contains a second material capable of containing the specific element, the second material releasing or absorbing the specific element in accordance with the external stimulation.

44 Claims, 18 Drawing Sheets

U.S. PATENT DOCUMENTS

| | | | | |
|---|---|---|---|---|
| 3,169,163 | A | * | 2/1965 | Nassenstein ................ 315/149 |
| 3,499,157 | A | * | 3/1970 | Satake et al. .......... 250/214 VT |
| 4,030,098 | A | * | 6/1977 | Nahmias ....................... 342/2 |
| 5,055,367 | A | * | 10/1991 | Law .......................... 430/58.8 |
| 5,149,957 | A | * | 9/1992 | Pierce et al. ............. 250/214.1 |
| 5,384,618 | A | * | 1/1995 | Schurman et al. ............. 355/32 |
| 5,635,729 | A | | 6/1997 | Griessen et al. |
| 6,067,184 | A | * | 5/2000 | Bonhote et al. ............. 359/265 |
| 6,097,530 | A | * | 8/2000 | Asher et al. ................. 359/288 |
| 6,101,298 | A | | 8/2000 | Den Broeder et al. |
| 6,144,512 | A | * | 11/2000 | Eden .......................... 359/885 |
| 6,259,853 | B1 | | 7/2001 | Chen et al. |
| 6,310,725 | B1 | | 10/2001 | Duine et al. |
| 6,317,531 | B1 | | 11/2001 | Chen et al. |
| 6,426,827 | B1 | * | 7/2002 | Bonhote et al. ............. 359/265 |
| 6,437,900 | B1 | | 8/2002 | Cornelissen et al. |
| 6,605,293 | B1 | * | 8/2003 | Giordano et al. ............ 424/423 |
| 6,624,937 | B2 | * | 9/2003 | Kashima ..................... 359/495 |
| 6,680,790 | B2 | * | 1/2004 | Johnson et al. ............. 359/245 |
| 2002/0036816 | A1 | | 3/2002 | Johnson et al. |
| 2005/0166953 | A1 | * | 8/2005 | Baldeschwieler ........... 136/246 |

FOREIGN PATENT DOCUMENTS

| | | |
|---|---|---|
| JP | 2001-117124 | 4/2001 |
| JP | 2001-133817 | 5/2001 |
| JP | 2002-525679 | 8/2002 |
| JP | 2002-542513 | 12/2002 |

OTHER PUBLICATIONS

Official Communication issued in the corresponding Taiwanese Application No. 093106713, mailed on Jul. 4, 2006.

Huiberts et al., "Yttrium and Lanthanum Hydride Films with Switchable Optical Properties," Nature, Mar. 1996, pp. 231-234, vol. 380.

Von Rottkay et al., "Effect of Hydrogen Insertion in the Optical Properties of PD-Coated Magnesium Lanthanides," Third International Meeting on Electrochromics in London, England, Sep. 1998, pp. 1-11.

Kremers et al., "Optical Transmission Spectroscopy of Switchable Yttrium Hydride Films," Physical Review B, Feb. 1998, vol. 57, No. 8, pp. 4943-4949.

Yoshimura et al., 31-a-Zs-14, "Optical Property of Mg2Ni Switchable Mirror Thin Films," Japan Society of Applied Physics, Mar. 2001 Spring Meeting, p. 993.

Ouwerkerk, "Thin Film Electrochromic Device with Metal Hydride as Active Material Using Calcium Fluoride Hydride as a Hydrogen Conductor," 2001.

Van Der Sluis et al., "Solid State Gd-Mg Electrochromic Devices with ZrO2HY Electrolyte," Apr. 2001.

Griessen, "Switchable Mirrors," Europhysics News; vol. 32; No. 2; Mar. 2001; pp. 1-9.

Uchida: "Display System," U.S. Appl. No. 10/549,584; filed on Sep. 14, 2005.

* cited by examiner (a)

(b) Mirror Diffuse Reflection ⇔ Absorption (a)

(b)

(a) Mirror Reflection ⇔ Absorption (b)

(c) Diffuse Reflection ⇔ Absorption (a) Mirror Reflection ⇔ Absorption (b)

(c) Diffuse Reflection ⇔ Absorption

Diffuse Reflection ⇔ Absorption (a)

(b)

DIMMING DEVICE AND DISPLAY DEVICE INCORPORATING THE SAME

BACKGROUND OF THE INVENTION

1. Field of the Invention

The present invention relates to a dimming device and a display device capable of controlling the reflectance and transmittance of light.

2. Description of the Related Art

A phenomenon in which a metal thin film of yttrium (Y), lanthanum (La), or the like bonds to hydrogen to change into a hydride which can transmit visible light has been reported (specification of U.S. Pat. No. 5,635,729, and Huibert and six others, Nature, (U.K.), March 1996, vol. 380, pp. 231-234). Since this phenomenon is reversible, by adjusting the hydrogen pressure in the atmosphere, it becomes possible to cause the thin film to change between a metallic luster state and a transparent state.

By changing the optical characteristics of the above thin film so as to switch between a state exhibiting a metallic luster and a transparent state, it becomes possible to realize a dimming mirror which is capable of freely adjusting the reflectance/transmittance of light. If a dimming mirror is used as a windowpane of a building or an automobile, for example, it becomes possible to shield (reflect) or transmit sunlight as necessary.

Such a dimming mirror has, for example, a structure in which a palladium layer is formed on a yttrium thin film. The palladium has a function of preventing surface oxidation of the yttrium thin film, and a function of causing hydrogen molecules in the atmosphere to be efficiently changed into hydrogen atoms so as to be supplied to yttrium. When yttrium chemically bonds to hydrogen atoms, either $YH_2$ or $YH_3$ is formed. While $YH_2$ is a metal, $YH_3$ is a semiconductor and has a forbidden band width which is greater than the energy of visible light, and therefore is transparent.

Moreover, since changes of states between $YH_2 \leftrightarrow YH_3$ occur rapidly (about several seconds) even at room temperature, it is possible to perform switching between a reflection (metallic luster) state and a transparent state depending on the amount of hydrogen content in the atmosphere.

As another material which is capable of such transitioning between metallic luster $\leftrightarrow$ transparent, a $Mg_2Ni$ thin film is disclosed in Japan Society of Applied Physics, 2001 Spring Meeting, 31-a-ZS-14, for example.

The above conventional technique has a problem described below.

Firstly, in order to change the optical state of a thin film, it is necessary to expose the thin film to an hydrogen atmosphere. Specifically, it is necessary to control the amount of hydrogen (hydrogen partial pressure) in an atmosphere gas which is in contact with the thin film. Therefore, it is difficult to realize a practical dimming device by using the aforementioned conventional constitution.

Secondly, in the dimming device according to the conventional technique, a thin film containing a material which is capable of transitioning between metallic luster $\leftrightarrow$ transparent (hereinafter referred to as "dimming material"), e.g., yttrium, is used as a dimming layer. Such a dimming device has the following problems.

The switching between the metallic luster and transparent states in the dimming layer (thin film) occurs as hydrogen ions permeate the dimming layer. However, even if the hydrogen pressure in the atmosphere changes, reactions with hydrogen ions may occur at the dimming layer surface, but permeation of hydrogen ions into the thin film would be difficult. Therefore, it is possible for some of the yttrium atoms or molecules containing yttrium to remain unreacted. As a result, it will be difficult to enlarge the difference in reflectance between the metallic luster state and the transparent state exhibited by the dimming layer. Moreover, in order to use the dimming device for a broader range of purposes, it would be necessary to reduce the time (switching speed) required by the yttrium thin film (which is the dimming layer) to transition between the metallic luster state and the transparent state.

In order to enlarge the difference in reflectance between the metallic luster state and the transparent state and reduce switching speed, it might be conceivable to improve the reaction efficiency of $YH_2$ (or Y) $\leftrightarrow YH_3$ in the dimming layer, for example. However, in a conventional constitution which uses a thin film as a dimming layer, there are limits to improvement in the reaction efficiency.

Moreover, when applying a dimming device to a display apparatus, it would generally be advantageous if the dimming layer had a state in which light is diffuse-reflected. However, the dimming layer in the dimming device according to the conventional technique above mirror-reflects light in its metallic luster state, and therefore is difficult to be applied to a display apparatus.

Thirdly, in order to change the optical state of the thin film according to the conventional technique above, it is necessary to hydrogenate the material, contained in the thin film, which is capable of transitioning between metallic luster $\leftrightarrow$ transparent, by exposing the thin film to a hydrogen atmosphere. Specifically, it is necessary to control the hydrogen amount (hydrogen partial pressure) in the atmosphere gas which is in contact with the thin film. Since such control of hydrogen amount is performed across the entire surface of the thin film, the optical state of the entire surface of the thin film changes.

Thus, conventional dimming devices are based on the premise that they are to be applied to the purpose of changing the optical state of the entire surface of the thin film such as a dimming mirror, and applications to a display apparatus have not been proposed. In order to realize an application to a display apparatus, it would be necessary to compartmentalize the thin film into a plurality of pixels, and control the optical state of each pixel. However, it would be difficult, and impractical, to control the hydrogen amount in the atmosphere gas with respect to each pixel.

The present invention has been made in view of the above circumstances, and it is intended to provide a dimming device which is capable of allowing the state of a thin film to transition between a metallic reflection state and a transmitting state, without relying on a control of the hydrogen amount (hydrogen partial pressure) in the atmosphere gas. Moreover, it is intended to provide a dimming device which comprises a dimming layer containing, in the form of particles, a material that is capable of transitioning between a metallic luster state and a transparent state, and which is therefore able to switch the optical characteristics of the dimming layer more rapidly and can be applied to a broader range of purposes. Furthermore, it is intended to provide a display device by utilizing the aforementioned dimming device.

SUMMARY OF THE INVENTION

A dimming device according to the present invention is a dimming device comprising a layered structure including a first layer and a second layer, such that a light reflectance of the first layer changes in response to an external stimulation, characterized in that the first layer contains a first material whose optical characteristics change in accordance with a concentration of a specific element, and the second layer contains a second material capable of containing the specific element, the second material releasing or absorbing the specific element in accordance with the external stimulation. Thus, the above objective is met.

In a preferred embodiment, the element is hydrogen, and the first material is able to transition between a light reflecting state and a light transmitting state in accordance with a hydrogen concentration.

In a preferred embodiment, the first layer diffuse-reflects light when the first material is in the light reflecting state.

In a preferred embodiment, the first material is particles.

It is preferable that a diameter of the particles is equal to or greater than 350 nm and equal to or less than a thickness of the first layer.

The first layer may contain colored particles having a visible light absorbing ability, the particles being adsorbed to the colored particles.

In a preferred embodiment, the second layer contains a hydrogen storage material.

Preferably, operation occurs in a region where respective hydrogen equilibrium pressure-composition isotherms (PTC characteristic curves) of the first layer and the second layer are substantially flat.

It is preferable that, in the region where the PTC characteristic curves are substantially flat, hydrogen equilibrium pressures of the first layer and the second layer are about the same.

It is preferable that a range of hydrogen storage amount of the second layer in the region where the PTC characteristic curve is substantially flat encompasses a range of hydrogen storage amount of the first layer in the region where the PTC characteristic curve is substantially flat.

In a preferred embodiment, the second material releases or absorbs the specific element through exchanges of electrons.

In a preferred embodiment, the second material releases or absorbs the specific element in response to light irradiation.

The second layer may contain a material having a photocatalytic ability.

A pair of conductive layers for forming an electric field for causing ions of the specific element to move from the second material to the first material, or from the first material to the second material may be comprised.

The first and second layer may be positioned between the pair of conductive layers.

The first layer may have conductivity, and function as one of the pair of conductive layers.

The second layer may have conductivity, and function as one of the pair of conductive layers.

In a preferred embodiment, the second layer requires a light transmitting ability.

In a preferred embodiment, at least one of an upper face and a lower face of the first layer has bumps and dents, and the first layer transitions between a state of diffuse-reflecting light and a state of transmitting light, further comprising a light absorbing layer for absorbing light having been transmitted through the first layer.

In a preferred embodiment, the second layer requires a visible light absorbing ability.

In a preferred embodiment, at least one of an upper face and a lower face of the first layer has bumps and dents, and the first layer transitions between a state of diffuse-reflecting light and a state of transmitting light, and the second layer is disposed opposite from a light incident face of the first layer.

At least one of the first layer and the second layer may have a multi-layer structure.

Another dimming device according to the present invention is a dimming device comprising a dimming layer whose light reflectance changes in response to an external stimulation, characterized in that the dimming layer contains a first material whose optical characteristics change in accordance with a concentration of a specific element, the first material being particles. Thus, the above objective is met.

In a preferred embodiment, the first material is able to transition between a light reflecting state and a light transmitting state in accordance with the concentration of the specific element.

In a preferred embodiment, the dimming layer diffuse-reflects light when the first material is in the light reflecting state.

It is preferable that a diameter of the particles is equal to or greater than 350 nm and equal to or less than a thickness of the dimming layer.

The dimming layer may contain colored particles having a visible light absorbing ability, the particles being adsorbed to the colored particles.

The specific element may be hydrogen.

A still another dimming device according to the present invention is a dimming device comprising a dimming layer whose light reflectance changes in response to an external stimulation, characterized in that the dimming layer contains a first material whose optical characteristics change in accordance with a concentration of a specific element, and contains a second material capable of containing the specific element, the second material releasing or absorbing the specific element in accordance with the external stimulation, wherein the first material is particles. Thus, the above objective is met.

A display device according to the present invention is a display device including a plurality of pixels, each of the plurality of pixels having: a first layer containing a first material whose optical characteristics change in accordance with a concentration of a specific element; a second layer containing a second material capable of containing the specific element, the second material releasing or absorbing the specific element upon application of a voltage; and a pair of electrodes for applying the voltage to the second layer, characterized in that a light reflectance of the first layer changes in response to the voltage. Thus, the above objective is met.

In a preferred embodiment, the first material is able to transition between a light reflecting state and a light transmitting state in accordance with the concentration of the specific element.

In a preferred embodiment, the first layer diffuse-reflects light when the first material is in a light reflecting state.

In a preferred embodiment, the first material is particles.

In a preferred embodiment, at least one of an upper face and a lower face of the first layer has bumps and dents.

In a preferred embodiment, the first layer further contains colored particles, the first material being adsorbed to the colored particles.

In a preferred embodiment, the first layer transitions between a state of diffuse-reflecting light and a state of transmitting light, and the second layer requires a light transmitting ability, further comprising a light absorbing layer for absorbing light having been transmitted through the first layer and the second layer.

In a preferred embodiment, the first layer transitions between a state of diffuse-reflecting light and a state of transmitting light, the second layer having a visible light absorbing ability, and the second layer is disposed opposite from a light incident face of the first layer.

The second layer may be disposed on a light incident side of the first layer, and function as a color filter.

The specific element may be hydrogen, and the second layer may contain a hydrogen storage material.

It is preferable that the second material releases or absorbs the specific element through exchanges of electrons.

The first layer may have conductivity, and function as one of the pair of electrodes.

The display device according to the present invention may be a reflection type display device.

The display device according to the present invention may further comprise a backlight.

The first layer may transition between a state of mirror-reflecting light and a state of transmitting light, and a backlight may be further comprised.

BRIEF DESCRIPTION OF THE DRAWINGS

FIGS. 5(a) and (b) are cross-sectional views showing a dimming layer and a conversion layer of a second embodiment of the dimming device according to the present invention. FIGS. 5(a) to (c) are cross-sectional views showing a dimming layer and a conversion layer of a tenth embodiment of the dimming device according to the present invention.

DETAILED DESCRIPTION OF PREFERRED EMBODIMENTS

First, the dimming principle which is utilized in displaying by the display device according to the present invention will be described. FIGS. 1(a) to (c) are schematic cross-sectional views illustrating the dimming principle of the display device according to the present invention.

A dimming layer M1 shown in FIG. 1(a) contains a dimming material whose optical characteristics change in accordance with the concentration of a specific element. Preferable examples of the dimming material are Y, La, and $Mg_2Ni$ alloy as described above, and the dimming layer 1 is a thin film of such a dimming material, for example. Materials such as Y, La, and $Mg_2Ni$ alloy undergo transitions between metal and semiconductor (or insulator) states in accordance with hydrogen concentration.

A conversion layer M2 contains a material capable of containing a specific element such as hydrogen (which in the present specification is referred to as a "conversion material"). The conversion material releases or absorbs the aforementioned specific element (e.g., hydrogen) in accordance with an external stimulation, such as a charge (electrons or holes) injection or light irradiation.

The dimming layer M1 and the conversion layer M2 shown in FIG. 1(a) both have the ability to absorb/release hydrogen, and have an electrical conductivity for being able to move charges (electrons or holes) and ions.

Hereinafter, a mechanism where, responsive to injection/release of a charge, hydrogen ions move from the conversion layer M2 to the dimming layer M1, or from the dimming layer M1 to the conversion layer M2, will be described. A characteristic feature of this mechanism lies in that ions of a specific element (hydrogen) which causes a change in the optical characteristics of the dimming layer M1 are moved, not via an electrochemical reaction, but by way of a charge movement.

Figure 1:
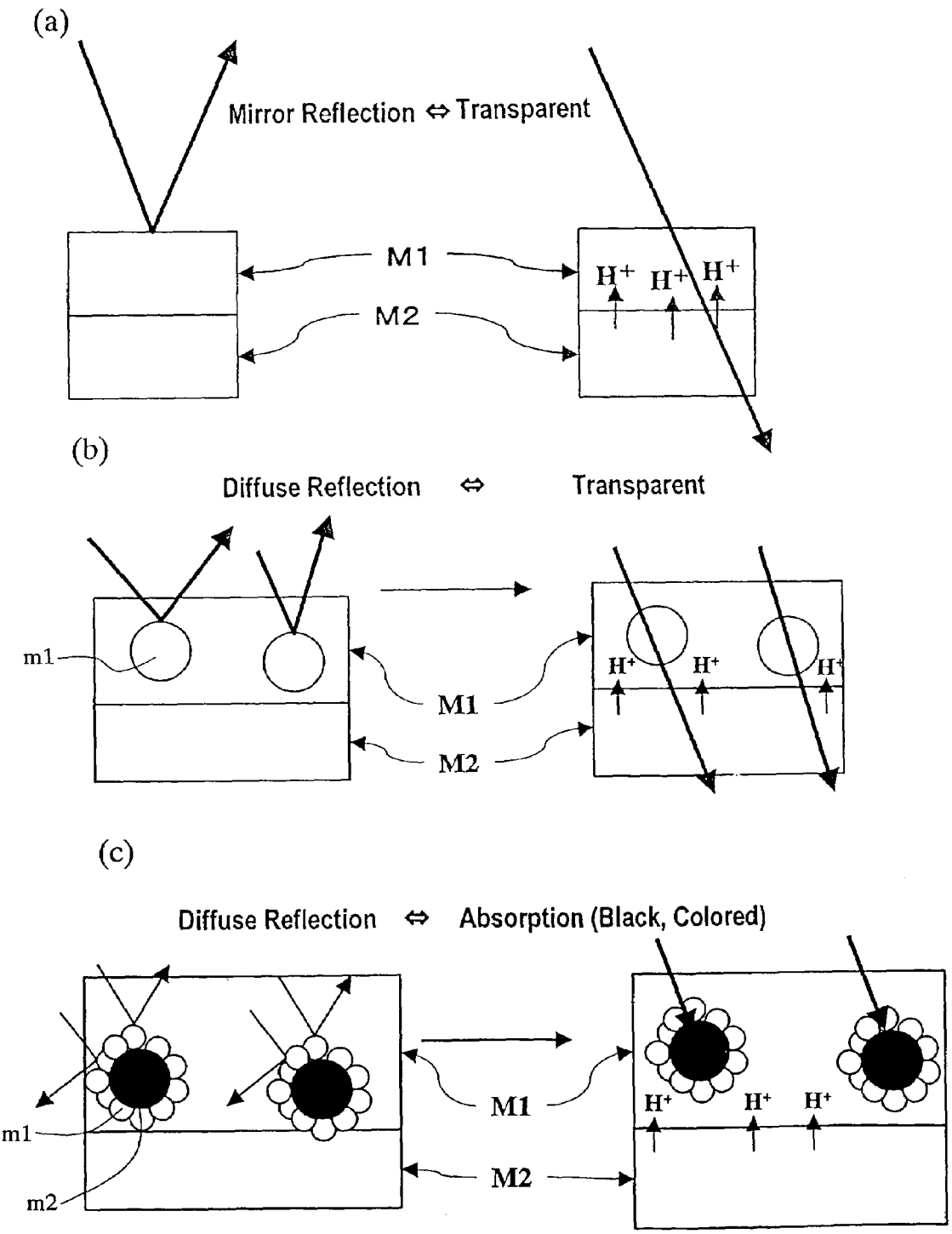
FIGS. 1(a) to (c) are cross-sectional views schematically illustrating the dimming principle utilized in the present invention.
Figure 2:
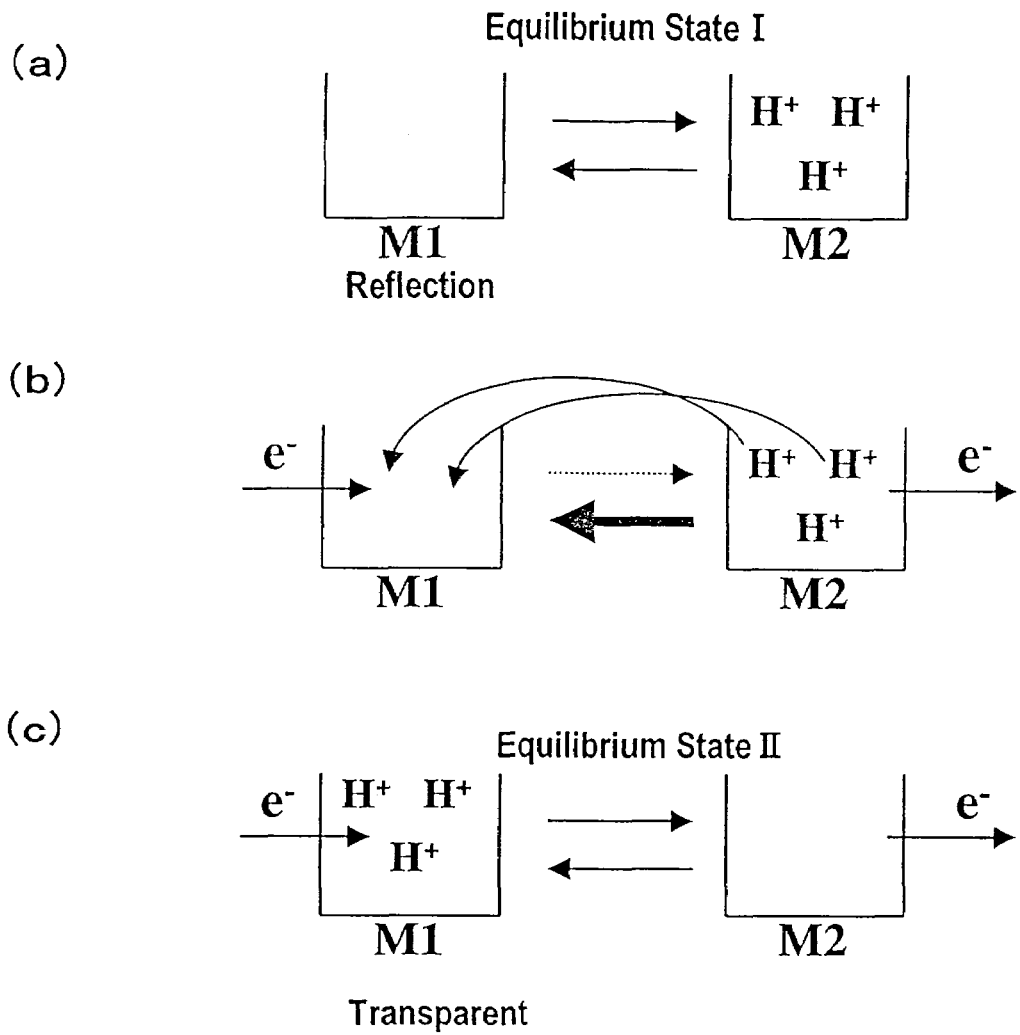
FIGS. 2(a) to (c) are diagrams illustrating the operation principles of a dimming device and a display device according to the present invention.

FIG. 2(a) shows an initial state of the dimming layer M1 and the conversion layer M2 included in the structure of FIG. 1. In this initial state, an equilibrium state is established between the dimming layer M1, which substantially stores no hydrogen, and the conversion layer M2, which has hydrogen stored in advance. Since the dimming layer M1 lacks a sufficient concentration of hydrogen, the dimming layer M1 is in a metallic state, thus exhibiting metallic luster.

Next, as shown in FIG. 2(b), a negative potential is applied to the dimming layer M1 side, while a positive potential is applied to the conversion layer M2 side. At this time, electrons are injected to the dimming layer M1 from a negative electrode (not shown), so that the dimming layer M1 enters an electron-rich state. On the other hand, holes are injected to (i.e., electrons are withdrawn from) the conversion layer M2. The holes which have been injected to the conversion layer M2 move inside the conversion layer M2 toward the dimming layer M1. During such movements of the holes, if further holes continue to be injected to the conversion layer M2, the conversion layer M2 enters a hole-rich state. As a result, the conversion layer M2 enters a state where hydrogen ions are likely to be released, whereas in the dimming layer M1, the amount of hydrogen ions which are received from the conversion layer M2 and retained therein increases.

Therefore, the hydrogen equilibrium state which existed between the dimming layer M1 and the conversion layer M2 is broken, so that the dimming layer M1 takes a state where more hydrogen is likely to be retained, and thus the hydrogen ions released from the conversion layer M2 will move to the dimming layer M1. Thus, as shown in FIG. 2(c), a new equilibrium state is established. In this state, the hydrogen which has moved to the dimming layer M1 bonds to the dimming material, whereby the dimming layer M1 becomes transparent.

The above reaction can be described as M1+M2(H)→M1(H)+M2. Herein, M1(H) and M2(H) respectively represent a state where hydrogen is retained in the dimming layer M1 and a state where hydrogen is retained in the conversion layer M2.

As is clear from the above explanation, only hydrogen ion exchanges take place between the dimming layer M1 and the conversion layer M2, and no other reactions involving ions are taking place. Moreover, when the polarities of the applied voltages are inverted from the state of FIG. 2(c), a reaction will progress in the opposite direction, thus returning to the original equilibrium state shown in FIG. 2(a). According to this mechanism, by applying an external stimulation, e.g., voltage application, to the conversion layer M2 containing a conversion material, the amount of hydrogen content in the dimming layer M1 can be changed. Therefore, a dimming device which utilizes this mechanism is more practical than any dimming device according to the conventional technique where it is necessary to control the hydrogen partial pressure in the atmosphere.

Instead of the structure shown in FIG. 1(a), a layered structure including a dimming layer M1 and a conversion layer M2 as shown in FIG. 1(b) may be comprised. The dimming layer M1 in FIG. 1(b) contains particles m1 (which may hereinafter be referred to as "dimming particles") of a dimming material whose optical characteristics change in accordance with the concentration of a specific element. Preferable examples of the dimming material are Y, La, and $Mg_2Ni$ alloy as described above. The dimming layer M1 contains a binder resin, for example, and the aforementioned dimming particles m1 are dispersed within the binder resin. Moreover, the dimming layer M1 also contains an electrolytic material (e.g., a conductive polymer) for transporting hydrogen ions or hydrogen from the conversion layer M2. The conversion layer M2 is substantially similar to the conversion layer M2 which has been described with reference to FIG. 1(a).

In the case where the structure shown in FIG. 1(b) is used, in an initial state (FIG. 2(a)) of the dimming layer M1 and the conversion layer M2, the dimming layer M1 lacks a sufficient concentration of hydrogen, and therefore each of the dimming particles m1 dispersed in the dimming layer M1 is in a metallic state and mirror-reflects light. Since the dimming particles m1 cause the light entering the dimming layer M1 to be reflected in random directions, the dimming layer M1 as a whole diffuse-reflects the light. As a result, white reflected light is obtained. When hydrogen ions move to the dimming layer M1 and a new equilibrium state is established (FIG. 2(c)), the hydrogen which has moved to the dimming layer M1 bonds to the dimming particles m1, whereby each dimming particle m1 becomes transparent.

Alternatively, a layered structure including a dimming layer M1 and a conversion layer M2 shown in FIG. 1(c) may be used. The dimming layer M1 in FIG. 1(c) further contains colored particles m2 such as black particles, and differs from the dimming layer M1 of FIG. 1(b) in that the dimming particles m1 are adsorbed to the colored particles m2. The conversion layer M2 of FIG. 1(c) is substantially similar to the conversion layer M2 which has been described with reference to FIG. 1(a).

In the case where the structure shown in FIG. 1(c) is used, in an initial state (FIG. 2(a)), each of the dimming particles m1 adsorbed to the colored particles m2 is in a metallic state and mirror-reflects light, as in the structure of FIG. 1(b). Since the dimming particles m1 cause light entering the dimming layer M1 to be reflected in random directions, the dimming layer M1 as a whole diffuse-reflects the light. As a result, white reflected light is obtained. When hydrogen ions move to the dimming layer M1 and a new equilibrium state is established (FIG. 2(c)), the hydrogen which has moved to the dimming layer M1 bonds to the dimming particles m1, whereby each dimming particle m1 becomes transparent. As a result, the dimming layer M1 exhibits the color of the colored particles m2, e.g., black. Thus, the dimming layer M1 transitions between a diffuse-reflection state and a colored state (also referred to as an absorbing state). Therefore, in this structure, it is not necessary that the conversion layer M2 be transparent.

In the present invention, a mechanism in which hydrogen ions move between the dimming layer M1 and the conversion layer M2 responsive to charge injections as shown in FIGS. 2(a) to (c) is utilized, but the present invention is not limited thereto. The display device according to the present invention may utilize a mechanism where hydrogen ions move between the conversion layer M2 and the dimming layer M1 via electrochemical reactions, for example. In this case, a layer of solid electrolyte may further be provided between the dimming layer M1 and the conversion layer M2, and the binder resin contained in the dimming layer M1 of FIG. 1(b) or (c)

may be used as a solid electrolyte. Alternatively, the display device of the present invention may not comprise the conversion layer M2. In this case, the dimming layer M1 may further contain a conversion material, and hydrogen ions may be moved between the dimming particles m1 and the conversion material inside the dimming layer M1.

Regardless of which mechanism is utilized, the concentration of hydrogen ions in the dimming layer M1 changes in accordance with the voltage applied to the conversion material, whereby the optical characteristics of the dimming layer M1 change as shown in FIGS. 1(a) to (c).

Note that, among the above, it is preferable to utilize the mechanism in which hydrogen ions are moved based on charge injections. In the case where hydrogen is driven by causing the hydrogen equilibrium state to be changed based on movements of charges (electrons or holes), it is unnecessary to involve any ions other than hydrogen ions in the reaction. This leads to an advantage in that the response speed is higher than in the case where a mechanism based on an electrochemical reaction involving a plurality of kinds of ions is utilized. Moreover, since no electrochemical reaction occurs, there is little possibility for hydrogen gas to be generated at the positive side, so that a stable operation is enabled as an electronic device.

Since the present invention realizes the aforementioned dimming principle, it is possible to drive hydrogen by causing the hydrogen equilibrium state to be changed based on movements of charges (electrons or holes). Therefore, it is unnecessary to involve any ions other than hydrogen ions in the reaction. As a result, the response speed becomes higher than in any electrochemical reaction that involves a plurality of kinds of ions. Moreover, since no electrochemical reaction occurs, there is little possibility for hydrogen gas to be generated at the positive side, so that a stable operation is enabled as an electronic device.

The aforementioned dimming principle can be suitably utilized in a display device. Such a display device would have a plurality of pixels, each pixel having a layered structure including a dimming layer M1 and a conversion layer M2. Display is performed by causing the light reflectance of the dimming layer M1 to be changed with respect to each pixel.

In response to a voltage applied to the conversion layer M2 containing a conversion material, the aforementioned display device is capable of changing the amount of hydrogen content in the dimming layer M1. Therefore, the display device according to the present invention is more practical than a dimming device according to the conventional technique where it is necessary to control the hydrogen partial pressure in the atmosphere. Moreover, in the conventional technique, the control of the hydrogen partial pressure is performed across the entire surface of the dimming layer M1, so that the optical characteristics of the dimming layer M1 will change across the entire surface of the dimming layer M1. On the other hand, the present invention utilizes the aforementioned mechanism so that, by controlling the applied voltage with respect to each pixel of the dimming layer M1, it becomes possible to change the optical characteristics with respect to each pixel.

Hereinafter, embodiments of the present invention will be described. Embodiments 1 to 8 are dimming devices utilizing the dimming principle described in FIG. 1(a). Embodiments 9 to 17 are dimming devices utilizing the dimming principle described in FIG. 1(b) or (c). Embodiments 18 to 25 are display devices each utilizing one of the dimming principles described in FIGS. 1(a) to (c).

Embodiment 1

Firstly, a first embodiment of the dimming device according to the present invention will be described with reference to FIG. 3.

The dimming device of the present embodiment has a layered structure including a dimming layer 1 and a conversion layer 2, such that the light reflectance (optical characteristics) of the dimming layer 1 changes in response to electrical stimulations. This dimming device comprises a pair of electrodes 3a, 3b sandwiching the dimming layer 1 and the conversion layer 2, and a substrate 4 supporting the layered structure. An appropriate voltage is to be externally applied to the pair of electrodes 3a, 3b. However, the electrode 3a and the electrode 3b may simply be short-circuited as necessary.

Note that the layering order of the conversion layer 2 and dimming layer 1 with respect to the substrate 4 is not limited to that which is shown. The conversion layer 2 may be disposed so as to be closer to the substrate 4, with the dimming layer 1 being formed thereabove.

The dimming layer 1 in the present embodiment contains a dimming material (e.g., yttrium) whose optical characteristics change in accordance with the hydrogen concentration. The whole or part of the dimming layer 1 may be composed of a single layer or multiple layers of dimming material. Alternatively, particles of dimming material may be present, in a dispersed or linked state, within a film which is composed of another material.

The conversion layer 2 contains a conversion material which is capable of containing hydrogen. This conversion material performs exchanges of electrons with the electrode 3a, thus effecting release/absorption of hydrogen ions ($H^+$).

In the illustrated example, a positive potential is applied to the electrode 3a and a negative potential is applied to the electrode 3b, whereby hydrogen ions are released from the dimming material in the conversion layer 2 containing a sufficient amount of hydrogen in advance. The released hydrogen ions move within an electric field which is generated in the layered structure, and reach the dimming layer 1, thus leaving the dimming material doped therewith. Such a mechanism of hydrogen release and movement is as described above. The dimming material in the dimming layer 1 bonds to hydrogen, thus forming a hydrogen metal compound. As a result, the dimming material, which was initially in a metallic state, changes to a semiconductor or insulator that transmits visible light.

The dimming layer 1 may be produced by a vapor deposition technique, a sputtering technique, or the like. In the case where the dimming layer 1 is to function as a mirror exhibiting a metallic luster, the dimming layer 1 is preferably formed from a film which has as good a planarity as possible.

The conversion material contained in the conversion layer 2 is able to store and retain atoms or ions of hydrogen in its stationary state, and changes its hydrogen storage amount (retained amount) in accordance with external stimulations. As this material capable of storing hydrogen, alloys such as $LaNi_5$, $MnNi_5$, $CaNi_5 \cdot TiMn_{1.5}$, $ZrMn_{1.5}$, $ZrMn_2$, TiNi, TiFe, and $Mg_2Ni$ can be used. Moreover, carbon nanotubes (CNT) may also be used.

The conversion layer 2 may contain an electrically conductive material in addition to the hydrogen storage material. If an electrically conductive material is contained in the conversion layer 2, it is possible to rapidly perform exchanges of hydrogen ions with the dimming layer 1. As an electrically conductive material, a material capable of ion transmission, such as a liquid or solid electrolyte, or a conductive polymer or a charge transfer complex which transmits charge (electrons or holes) can be used. Moreover, in addition to the aforementioned hydrogen storage material or electrically conductive material, a bonding material such as a binder resin may be added to the conversion layer 2 as necessary. Note that, in order to surely restrain the charge which has been injected from one electrode from immediately moving to the other electrode, a separator layer may be inserted between the dimming layer and the conversion layer. As the material of the separator layer, it is desirable to choose a material which permits ion movement but is unlikely to permit charge movement. For example, an ion exchanger, a porous insulator, an ion conductive polymer material or the like can be used. By disposing a separate layer composed of such a material, the charge which has been injected from an electrode is surely prevented from penetrating to the other electrode, whereby the charge movement efficiency between the dimming layer and the conversion layer can be enhanced.

In the case where the conversion layer 2 is composed of a mixture of a plurality of materials, a solution obtained by dissolving such materials in a solvent may be prepared and applied by a spin coating technique or a printing technique, whereby the conversion layer 2 can be easily formed. Such formation of the conversion layer 2 may be performed by an ink jet technique or any other thin film deposition technique.

As described above, according to the present embodiment, exchanges of charges and ions occur inside the conversion layer 2 responsive to application of a voltage to the electrodes 3a, 3b. As a result, owing to the aforementioned mechanism, hydrogen movement can be induced between the conversion layer 2 and the dimming layer 1. Therefore, for example, by using a dimming layer 1 which is undoped with hydrogen in an initial state and a conversion layer 2 having hydrogen stored in advance, if a voltage as shown in FIG. 1(a) is applied, hydrogen ions move from the positive side to the negative side, thus making the dimming layer 1 doped therewith. In other words, a hydrogen release reaction progresses at the positive side, whereas a combination reaction between hydrogen and a metal progresses at the negative side, whereby a hydrogen metal compound is formed. On the other hand, if a voltage in the opposite direction is applied, a hydrogen movement in the opposite direction occurs. Therefore, by reversing the polarity of the applied voltage, the optical state of the dimming layer 1 can be reversibly switched between metallic luster and transparent.

When only contemplating a movement of the hydrogen stored in the conversion layer 2, the electrode 3a and the electrode 3b might be short-circuited outside of the layered structure. Such short-circuiting would be a similar phenomenon to a discharging of a secondary battery, and enable restoration of the internal state of the layered structure to the initial state.

Since the conversion layer 2 and the dimming layer 1 have the ability to retain hydrogen, when voltage application is not performed (when the external circuit is open), no hydrogen movement occurs, so that the optical state of the dimming layer 1 is retained (memory function of the dimming layer). Therefore, by choosing a material having a good hydrogen retaining ability, it becomes possible to retain a dimmed state for a long period of time without consuming power.

Contrary to the above example, a dimming layer 1 doped with hydrogen in advance, and a conversion layer 2 in a state not storing hydrogen may be used. In that case, hydrogen may be moved from the dimming layer 1 to the conversion layer 2 by applying a positive potential to the dimming layer 1 and a negative potential to the conversion layer 2, thus causing a change in the optical state of the dimming material in the dimming layer 1.

In the present embodiment, the light reflectance/light transmittance of a dimming material can be controlled based on a doping amount of hydrogen. Therefore, by controlling the voltage to be applied to the electrode and application time (e.g., a duty ratio), the light reflectance/light transmittance of the dimming layer 1 can be controlled. By utilizing the memory ability based on hydrogen retaining ability, an appropriate light reflectance/light transmittance can be easily retained.

Figure 4:
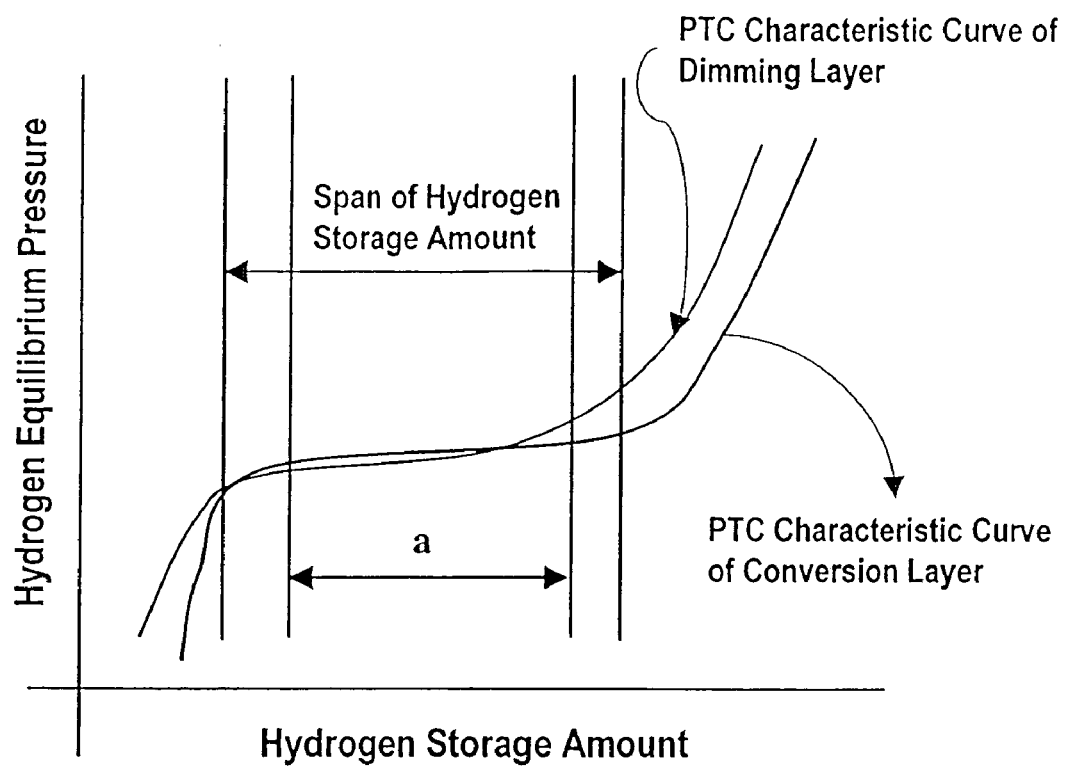
FIG. 4 is a graph showing a hydrogen equilibrium pressure-composition isotherm (PTC characteristic curve) of a dimming layer and a conversion layer.

In appropriately controlling such hydrogen storage/release, it is necessary to pay attention to the hydrogen equilibrium pressure-composition isotherm (hereinafter referred to as a "PTC characteristic curve"). As shown in FIG. 4, the PTC characteristic curve represents a relationship between the stored hydrogen amount and the hydrogen equilibrium pressure. In the graph of FIG. 4, the horizontal axis represents the hydrogen storage amount, whereas the vertical axis represents the hydrogen equilibrium pressure.

In a portion of the PTC characteristic curve that is generally parallel to the horizontal axis (hereinafter referred to as the "plateau region"), the stored hydrogen amount is capable of changing under a constant equilibrium pressure, and therefore hydrogen absorption/release can be reversibly carried out in a state under a constant hydrogen equilibrium pressure. For this reason, the dimming device of the present embodiment performs switching operations in the plateau region of the PTC characteristic curve.

It is desirable that the conversion layer 2 and the dimming layer 1 exhibit substantially similar PTC characteristics. More specifically, as shown in FIG. 4, it is desirable that the ranges of "hydrogen storage amount" of the plateau regions of the PTC characteristic curves of the conversion layer 2 and the dimming layer 1 overlap each other, and that the "hydrogen equilibrium pressure" levels are substantially equal. By exhibiting similar hydrogen equilibrium pressures, it becomes possible to smoothly perform hydrogen exchanges between the dimming layer 1 and the conversion layer 2. The reason is that, if the hydrogen equilibrium pressure difference between the dimming layer 1 and the conversion layer 2 becomes large, it will be impossible to perform hydrogen exchanges between the two layers even if hydrogen absorption/release occurs in each layer.

Moreover, it is more preferable that the hydrogen storage amount range (span) of the plateau region of the PTC characteristic curve of the conversion layer 2 is of a size encompassing the hydrogen storage amount range (span) of the plateau region of the PTC characteristic curve of the dimming layer 1. The reason is that, in the dimming device of the present embodiment, the light transmittance of the dimming layer 1 is controlled by the hydrogen doping amount of the dimming layer 1; therefore, if the extent of change in the hydrogen storage amount of the conversion layer 2 were smaller than the extent of change in the hydrogen doping amount that is necessary for causing a state change of the dimming layer 1, the optical state of the dimming layer 1 would not be sufficiently changed.

FIG. 3 is referred to again. In the case where the conversion layer 2 is transparent, the dimming device shown in FIG. 3 is capable of switching between a metallic reflection state and a transparent state. In order to establish a high transparency state, not only the substrate 4 and the electrodes 3a, 3b but also the conversion layer 2 must be formed from a material which has a high transmittance (no absorption) in the entire visible light region. However, a conversion material such as a hydrogen storage material is often a metal or a colored material, and it is difficult to form a conversion layer 2 having a high transparence from a layer of such a conversion material.

Therefore, it is preferable to form the conversion layer 2 by mixing microparticles of a conversion material with a transparent material. Specifically, nanoparticles having a grain size equal to or less than the light wavelength are formed from a conversion material, and these nanoparticles may be bonded with a binder resin which has a good transparence. A conversion layer 2 thus produced is not only able to exhibit both transparence and hydrogen storing ability, but an increase in the hydrogen absorption/release efficiency can also be expected since the conversion material has an increased surface area because of being made into nanoparticles. An increase in the hydrogen absorption/release efficiency of the conversion material is preferable because the response speed of the dimming operation would be improved. As a conversion material in an ultrafine particle state, a carbon type material (e.g., CNT and fullerene), a potassium-graphite interlayer compound or the like can also be used.

If a glass plate is used as the substrate 4, such a dimming device functions as dimming glass. Dimming glass is used as a windowpane for a building or an automobile, and by increasing the light reflection amount when there is strong external light as in the summertime or daytime, can restrain strong external light from entering, thus creating a comfortable space. It can also be used as an interior article which doubles as transparent glass and a mirror.

Embodiment 2

Figure 5:
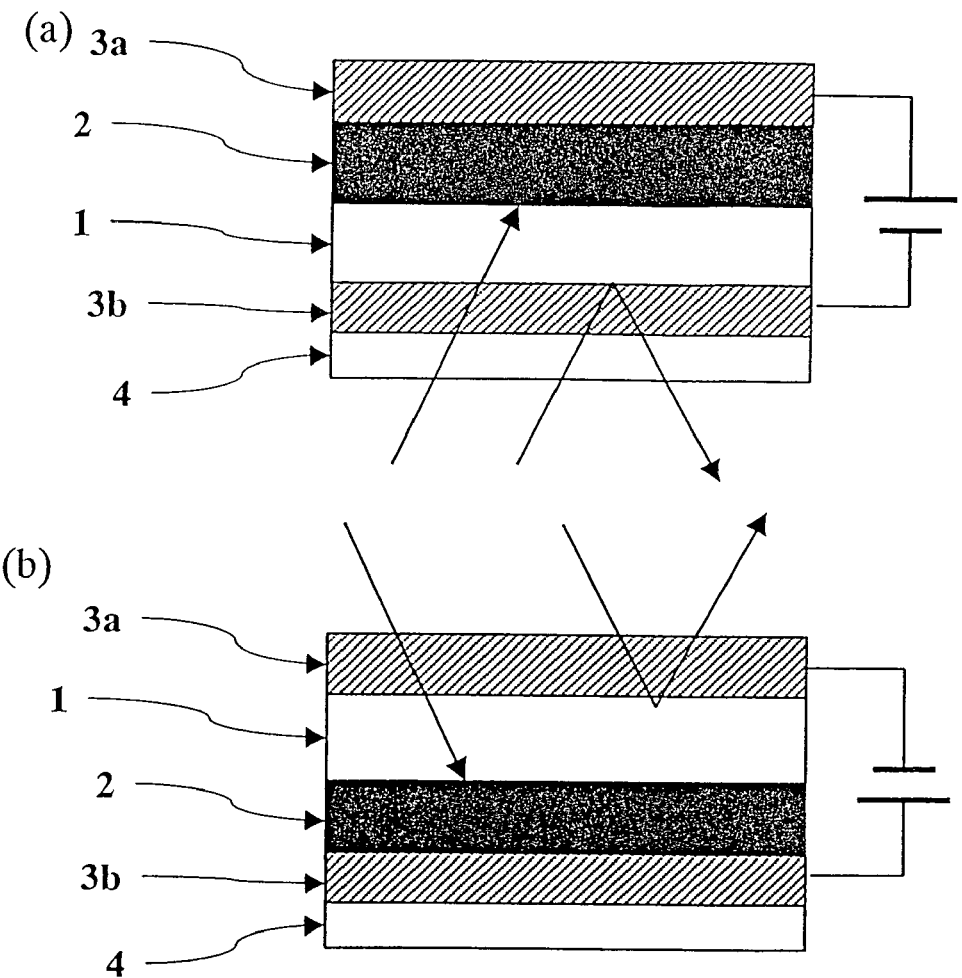
Figure 5:
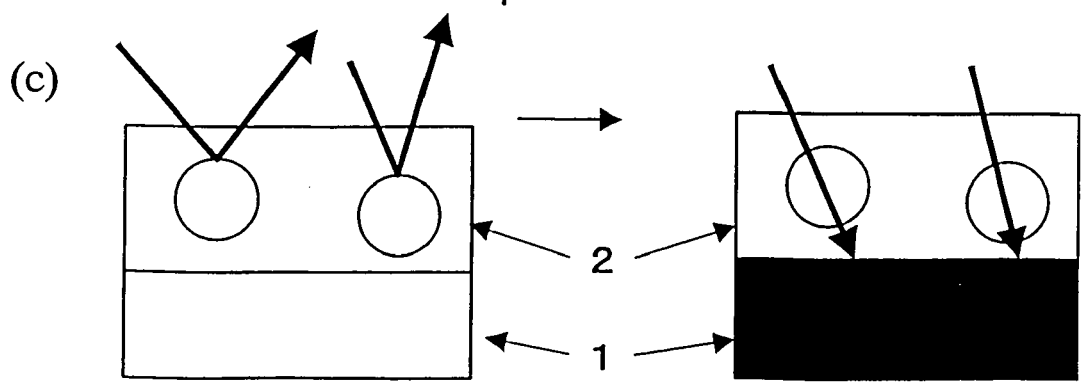

Hereinafter, with reference to FIGS. 5(a) and (b), a second embodiment of the dimming device according to the present invention will be described. In the present embodiment, switching between a metallic reflection state and an absorbing (black) state can be performed, instead of switching between a metallic reflection state and a transparent state.

FIG. 5(a) and FIG. 5(b) show dimming devices of constitutions featuring a conversion layer 2 and a dimming layer 1 in opposite layering orders to each other. Light enters from the rear face side of the substrate 4 in the constitution of FIG. 5(a), whereas light enters from the upper face side of the substrate 4 in the constitution of FIG. 5(b). Both dimming devices comprise a conversion layer 2 which absorbs visible light. Such a conversion layer 2 can be formed from a black CNT, for example. Note that, in the case where the conversion layer 2 is colored, or even in the case where the conversion layer 2 is transparent, if a pigment or a colored resin is mixed therein, switching between a metallic reflection state and a colored state is possible.

In the dimming device shown in FIG. 5(a), it is preferable that the substrate 4 and an electrode 3b in the underlying layer are formed from a transparent material. The substrate 4 may be formed from a material such as glass or plastic, as long as it is transparent. Preferably, the electrode 3b in the underlying layer is formed from a transparent conductive material such as ITO. The preferable electrode thickness in this case is prescribed to be 150 nm, for example.

The dimming layer 1 is composed of a yttrium film having a thickness of about 50 nm, for example. As the conversion layer 2, for example, it is possible to use a blend of: ultrafine particles (dispersion center radius: 10 nm) of an Ni alloy, which is an AB5 type Mm hydrogen storage alloy; a conductive polymer material P1 (a material capable of transporting both charges, i.e., electrons and holes); and, as a binder resin, an acrylic resin having about the same refractive index as that of glass.

Since the blended resin can be made into a solution, a film can be formed by spin coating. The thickness can be about 500 nm. As the hydrogen storage alloy to be used for the conversion layer 2, that which has hydrogen stored in advance can be used. As the dimming material, La, MgNi, or the like can be used other than yttrium.

In order to realize exchanges of charges and ions between the dimming layer 1 and the conversion layer 2, it is preferable to dispose a film of conductive polymer P1 between the dimming layer 1 and the conversion layer 2. In addition to a polymer film having a charge moving ability, a layer formed by using an electrolyte material may be disposed. Alternatively, a layer containing a polymer material having a charge moving ability and an electrolyte material may be disposed. By disposing such a film, movement of hydrogen ions becomes likely to occur via the electrolyte, and therefore it is possible to improve the characteristics.

A conversion layer 2 having light absorbing ability can also be formed from what is obtained (blended resin) by blending a potassium-graphite interlayer compound functioning as a hydrogen storage material and a conductive polymer material P1 (a material capable of transporting both charges, i.e., electrons and holes) with an acrylic resin functioning as a binder resin. Since the blended resin can be made into a solution, the conversion layer 2 can be formed by spin coating. The thickness of the conversion layer 2 may be prescribed to about 500 nm, for example.

For the dimming device shown in FIG. 5(a), when a voltage is applied to the electrodes 3a, 3b in such a manner that the conversion layer 2 is the positive side and the dimming layer 1 is the negative side, the light incident face of the dimming device, which exhibited metallic reflection in an initial state, gradually changes to a black state. This is because, as the dimming layer 1 becomes transparent, the black conversion layer 2 becomes visually perceivable. This state is retained even after power is terminated. On the other hand, if the electrode 3a and the electrode 3b are short-circuited, or if a voltage with an inverted polarity is applied to the electrodes 3a, 3b, the light incident-side face of the dimming device changes so as to exhibit metallic luster.

Note that, in the dimming device of the constitution shown in FIG. 5(b), light enters from above the figure. In this case, the electrode 3a in the upper layer of the dimming layer 1 must be transparent, but the substrate 4 and the underlying electrode 3 do not need to be transparent.

Embodiment 3

Next, with reference to FIG. 6(a), a third embodiment of the dimming device according to the present invention will be described.

The dimming device of the present embodiment comprises a conversion layer 2 which is transparent with respect to visible light, but further comprises a member which functions as a light absorbing layer (light absorbing plate) 5, and therefore is capable of switching between a metallic reflection state and a black (light absorbing) state. The light absorbing plate 5 may be a plate (black) that absorbs light in the entire visible light region, or a plate (any other color) that absorbs light in a part of the visible light region.

The light absorber 5 is disposed on the opposite side from the light incident side, with respect to the dimming layer 1. In the present embodiment, as shown in FIG. 6(a), the transparent conversion layer 2 is disposed above the dimming layer 1. However, the upper/lower relationship of the conversion layer 2 and the dimming layer 1 may be reversed.

Instead of disposing the light absorbing plate 5 on the rear face of the substrate, a layer having a light absorbing ability may be disposed on the light incident-side face on the substrate 4 or inside the layered structure. In the case where such a light absorbing layer does not have conductivity, it cannot be disposed between the dimming layer 1 and the electrode 3b, and therefore may be disposed between the substrate 4 and the electrode 3b. On the other hand, in the case where the light absorbing layer has conductivity, the light absorbing layer can be employed in an integral manner with the electrode 3b, or so as to replace the electrode 3b.

Note that, by employing a light absorbing layer exhibiting the same color and pattern as the color and pattern of the wall material, it would become possible to realize a dimming mirror which usually functions as part of the wall but can exhibit a mirror function when necessary.

Embodiment 4

Next, with reference to FIG. 7 and FIG. 8, a fourth embodiment of the dimming device according to the present invention will be described. The dimming device of the present embodiment is capable of switching between a metal diffuse reflection (white) state and a light absorbing state.

Figure 8:
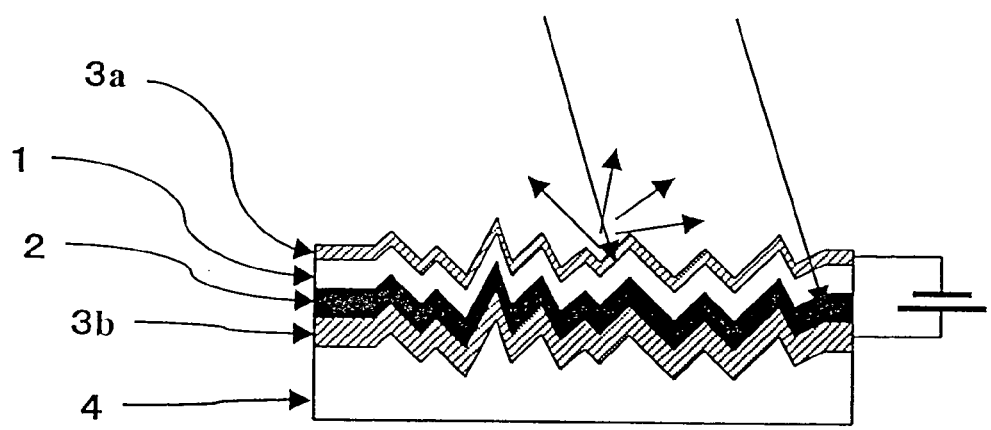
FIG. 8 is a cross-sectional view showing the fourth embodiment of the dimming device according to the present invention.

As shown in FIG. 8, the dimming device of the present embodiment has a structure in which an electrode 3a, a conversion layer 2, a dimming layer 1, and an electrode 3b are layered in this order on a substrate 4 having bumps and dents. In order to effect diffuse-reflection, minute bumps and/or dents are present on the surface of the dimming layer 1.

Next, with reference to FIG. 7, the operation of the dimming device of FIG. 8 will be described.

Figure 7:
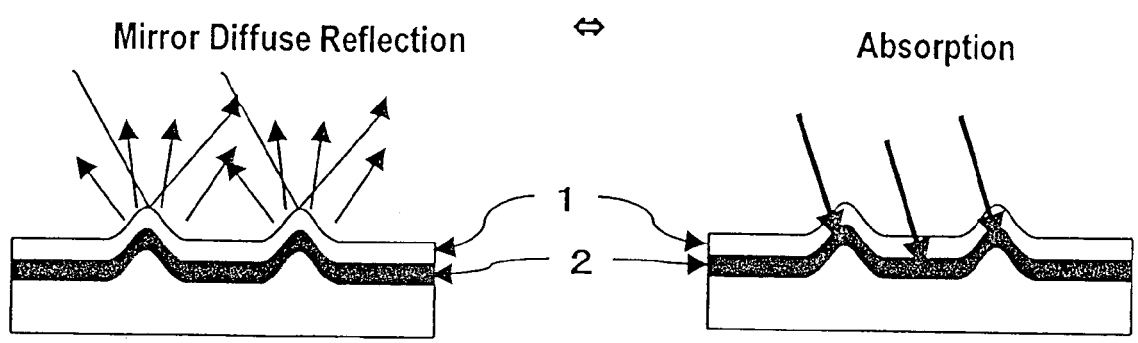
FIG. 7 is a cross-sectional view showing a fourth embodiment of the dimming device according to the present invention.

In FIG. 7, the electrodes 3a, 3b are omitted from illustration for simplicity. Since minute bumps are present on the surface of the dimming layer 1, light can be diffuse-reflected when the dimming layer 1 is in a metallic reflection state as shown in FIG. 7(a). On the other hand, when the dimming layer 1 is in a transparent state as shown in FIG. 7 (b), the conversion layer 2 in the underlying layer absorbs light.

In the example shown in FIG. 7, the surface of the substrate has minute bumps, and therefore the conversion layer 2 and the dimming layer 1 are of such an overall planarity that the bumps and dents of the substrate are reflected in their shapes. In other words, not only the upper face (the face on the light reflecting side) of the dimming layer 1, but also the bottom face has a shape reflecting the underlying bumps and dents. However, it is not necessary for the underlying conversion layer 2 to have a bump/dent structure. Therefore, minute dents and/or bumps may be formed only on the upper face of the dimming layer 1, while the substrate surface and the conversion layer 2 may be formed flat.

Thus, in accordance with the dimming device of the present embodiment, the reflected light is scattered and perceived as white. Therefore, while the dimming layer 1 is in a metallic reflection state, the surface of the dimming layer 1 appears white. On the other hand, while the dimming layer 1 is in a transparent state, the conversion layer 2 absorbs light, thus appearing black or some other color.

The dimming device of the present embodiment may have a similar constitution to that of any other embodiment, except that the substrate 4 having bumps and dents formed on its surface is used. For example, as the conversion layer 2, what is obtained by blending a potassium-graphite interlayer compound which is a hydrogen storage material, a conductive polymer material P1 (a material capable of transporting both charges, i.e., electrons and holes), and an acrylic resin serving as a binder resin can be suitably used.

Embodiment 5

Figure 9:
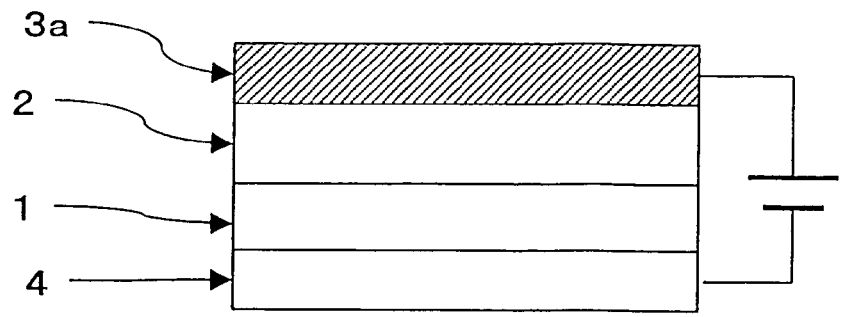
FIG. 9 is a cross-sectional view showing a fifth embodiment of the dimming device according to the present invention.

With reference to FIG. 9, a fifth embodiment of the dimming device according to the present invention will be described.

In dimming device of the present embodiment, as shown in FIG. 9, the dimming layer 1 itself doubles as one of the electrodes. Since the dimming layer 1 is fundamentally a metal thin film, the dimming layer 1 can function as an electrode. Since the dimming layer 1 doubles as an electrode, a step of forming an electrode is omitted, whereby the number of production steps for the dimming device can be reduced.

Note that, although the dimming device shown in FIG. 9 is a transparent-metal reflection type dimming device, the dimming layer 1 can double as an electrode in a dimming device of any other type described above.

Embodiment 6

Figure 10:
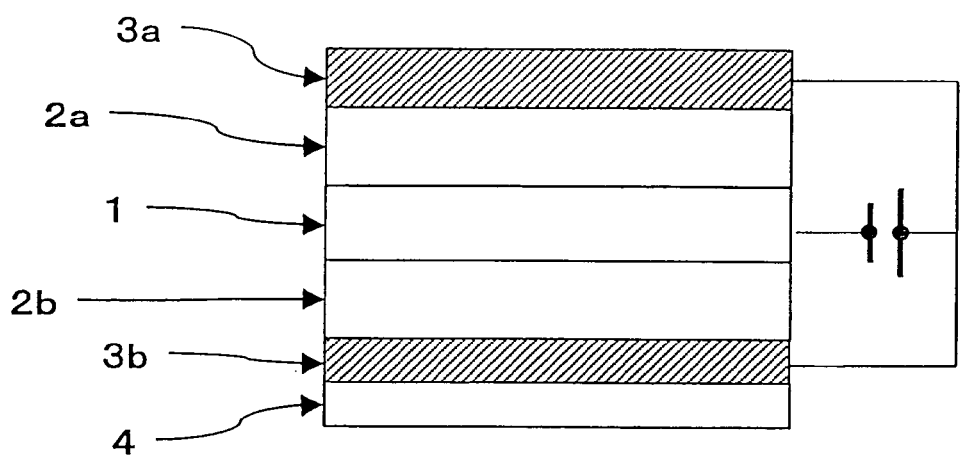
FIG. 10 is a cross-sectional view showing a sixth embodiment of the dimming device according to the present invention.

With reference to FIG. 10, a sixth embodiment of the dimming device according to the present invention will be described.

The present embodiment has a constitution in which a conversion layer is separated into a plurality of layers, i.e., a first conversion layer 2a, and a second conversion layer 2b. In the dimming device according to the present invention, the dimming layer 1 is doped with a specific element such as hydrogen, whereby the state of the dimming layer 1 is changed. Therefore, by adopting the constitution in which two conversion layers 2a, 2b sandwich the dimming layer 1, efficient doping becomes possible, whereby the speed of the state change necessary for dimming is improved. Since the dimming layer 1 can function as an electrode, the dimming layer 1 is used as an electrode in the example of FIG. 10.

In the example of FIG. 10, the portion which performs hydrogen absorption/release has a three-layer structure including the first conversion layer 2a, the dimming layer 1, and the second conversion layer 2b, but may have even more layers. Even if sufficient dimming cannot be attained in the case where the dimming layer 1 is of a single layer, it would become possible to attain a sufficient dimming by increasing the number of layers in the dimming layer 1.

Embodiment 7

Figure 11:
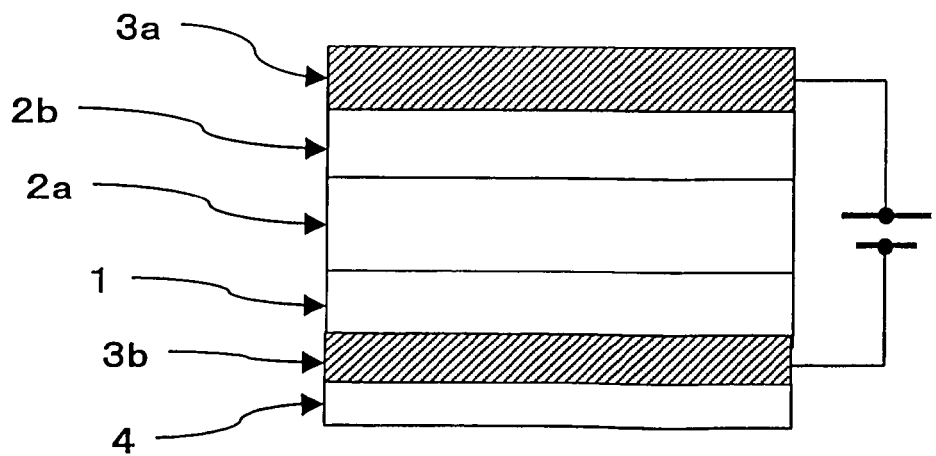
FIG. 11 is a cross-sectional view showing a seventh embodiment of the dimming device according to the present invention.

With reference to FIG. 11, a seventh embodiment of the dimming device according to the present invention will be described.

In the present embodiment, the conversion layer 2 has a multi-layer structure in order to separate the functions of the conversion layer 2. As described above, the functions of the conversion layer 2 are to store hydrogen, and to release/restore hydrogen in accordance with charge injection/release. Rather than realizing these functions with a single material, it would be easier to select a different material for each function, and stack layers that are composed of the respective materials. In other words, by separating the conversion layer into a first conversion layer 2a composed of a charge transport material or an electrolyte material for performing exchanges of charges or ions and a second conversion layer 2b formed from a material having a hydrogen storing function, efficient hydrogen movement can be realized.

In the present embodiment, a charge·ion exchange layer formed by mixing a conductive polymer material P1 (a material capable of transporting both charges, i.e., electrons and holes) and an acrylic resin having about the same refractive index as that of glass is used as the first conversion layer 2a.

Moreover, a blended resin obtained by mixing ultrafine particles (dispersion center radius: 10 nm) of an Ni alloy, which is an AB5 type Mm hydrogen storage alloy, and an acrylic resin having about the same refractive index as that of glass is used so as to function as the second conversion layer 2b.

Embodiment 8

Hereinafter, with reference to FIG. 12, an eighth embodiment of the dimming device according to the present invention will be described.

Figure 12:
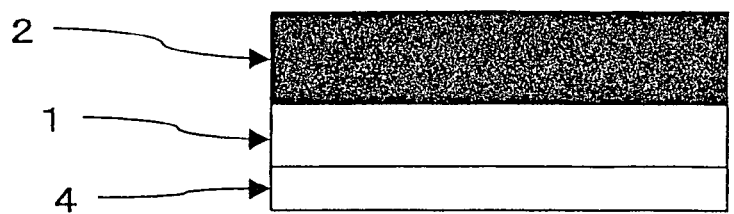
FIG. 12 is a cross-sectional view showing an eighth embodiment of the dimming device according to the present invention.

The present embodiment differs from each of the above-described embodiments in that no electrode structure is comprised, as shown in FIG. 12. In the present embodiment, a material having photocharge generating characteristics is added to the conversion layer 2. Herein, a material having photocharge generating characteristics means a material system which releases electrons or holes upon light irradiation. Specifically, it includes a fluorescent dye, $SiO_2$ microparticles, or organic molecules such as carbazole, or a polymer material obtained by polymerizing the same. Such materials release holes or electrons responsive to light irradiation, in accordance with their respective absorption wavelengths. Such charge causes the hydrogen contained in the hydrogen storage material to be isolated, transmitted within the conversion layer so as to be brought to the metal film of the dimming layer, thus hydrogenating the metal film. Usually, a material showing absorption in the visible light region is preferably used because dimming is to be performed in the visible light region. However, in the case where it is desirable to control the dimming amount based on the intensity of ultraviolet rays or heat rays (infrared rays), a material system showing absorption in such regions may be used.

This dimming device, whose conversion layer has photocharge generating characteristics, is characterized by its ability to perform dimming without particularly using an external control system such as an electric field. Since charge release takes place during light irradiation, it is possible to control the dimming amount.

As for the controlling of the initial state, hydrogen may be stored in the hydrogen storage material in the conversion layer, and the dimming layer may be kept in a non-doped state, whereby a metallic reflection state is obtained as an initial state. If the dimming layer is doped with hydrogen in advance, the dimming layer takes a transparent state, so that the initial state is determined by the coloration of the conversion layer.

Moreover, in the dimming amount control based on light irradiation, the dimming amount will vary with light amount accumulation. Therefore, there may be cases where even weak light may cause a change in the dimming amount if irradiation continues for a long time. This may be a problem if it is desirable to control the dimming amount based only on the intensity of light irradiation. In such cases, the hydrogen storing abilities of the conversion layer and the dimming layer, i.e., reaction speed with hydrogen, are to be adjusted. In the case where equilibrium is strongly shifted toward the dimming layer, even if incident light causes hydrogen to be transmitted to the conversion layer and leaves the conversion layer to be doped with hydrogen, most of the hydrogen is returned to the dimming layer. Furthermore, by controlling the irradiation amount that would exhibit conversion, the transparent state (hydrogen doped state) of the conversion layer can maintain the transparent state of the dimming layer while a certain intensity of light irradiation is being provided. In the case where the light irradiation is weak, or there is no more light irradiation, the equilibrium state will shift toward the conversion layer, so that the dimming layer will return to the initial state. In the case where the metallic reflection-transparent states of the dimming layer are repeatedly used with light irradiation, the direction of equilibrium state with respect to the dimming layer and the conversion layer may also be controlled.

In the present embodiment, as the dimming material in the dimming layer 1, a material whose PTC characteristic curve shows, in its flat region, an equilibrium pressure which is greater than that of the conversion material in the conversion layer 2 is chosen.

In the conversion layer 2, an Ru complex dye is additionally added. This dye absorbs light in the entire visible light region, and has characteristics such that it releases electrons upon light absorption. Moreover, the conversion layer 2 has hydrogen stored in advance.

If the dimming device of the present embodiment is irradiated with light, the degree of metallic reflection lowers when the light irradiation amount has reached a sufficient level, so that the dimming device begins to appear black. This happens because the electrons generated due to light irradiation cause a reduction reaction in the hydrogen storage material in the conversion layer 2, and the resultant hydrogen exceeds the hydrogen equilibrium pressure in the dimming layer 1. The hydrogen which has moved to the dimming layer 1 forms a hydrogenated compound therein, and makes the dimming layer 1 transparent. As a result, the color (black) of the conversion layer 2 is visually perceived through the dimming layer 1.

When light irradiation is stopped, the generation/supply of electrons stops, so that the state change of the dimming layer 1 also stops. Since a difference in hydrogen equilibrium pressure has occurred, the equilibrium state shifts toward the conversion layer, and most of the hydrogen which has moved to the dimming layer can again move to the conversion layer.

Thus, according to the present embodiment, the dimming amount can naturally be adjusted based on light irradiation. In the exemplary constitution above, the amount of reflection by the dimming layer 1 becomes smaller as the light irradiation intensity increases. However, by using a transparent material for the conversion layer and doping the dimming layer with hydrogen in advance, it becomes possible to provide a windowpane which can control transmission and reflection in accordance with light intensity. In this case, the dye which is included in the conversion layer becomes colored. Therefore, a completely transparent state would be difficult to obtain, but a device embodying color glass and reflection can be easily produced.

Instead of switching the state change of the dimming layer based on external light irradiation, it would be possible to control the hydrogen equilibrium state in accordance with intensity of irradiation light or a cumulative value of irradiation amounts to realize dimming. In the case where dimming is performed based only on light irradiation, it would be impossible to realize a dimming which is in accordance with the needs of the user. There may also be a problem in that hydrogen cannot be completely moved during the use of the dimming device, thus causing a shift in the initial state. In order to avoid such problems, it would be preferable to additionally provide electrodes. By adjusting the hydrogen doped amount with the additionally-provided electrodes, in conjunction with the dimming based on usual light irradiation, it will become possible to freely change the dimming amount. Moreover, initialization to a hydrogen equilibrium state can be performed by voltage application using electrodes, so that a dimming control which permits good reproducibility can be realized.

Embodiment 9

The dimming device of the present embodiment has a similar constitution to that of the dimming device of Embodiment 1 which has been described with reference to FIG. 3, except that the dimming layer 1 contains dimming particles. The dimming device of the present embodiment performs switching between a metal diffuse reflection state and a transparent state by utilizing the dimming principle illustrated in FIG. 1(b).

In the dimming layer 1 of the present embodiment, microparticles (e.g., yttrium or lanthanum, hereinafter referred to as "dimming microparticles") which have been formed by using a dimming material whose optical characteristics change in accordance with hydrogen concentration are dispersed in a binder resin.

The average grain size of the dimming microparticles contained in the dimming layer 1 is 1 μm, for example. The dimming microparticles are typically dispersed in a binder resin. As a binder resin, an acrylic resin having about the same refractive index as that of glass is used. Moreover, the dimming layer 1 further contains an electrically conductive material for performing exchanges of hydrogen ions and charge between the dimming microparticles and the conversion layer 2. As the electrically conductive material, a material capable of ion transmission, such as a liquid or solid electrolyte, or a conductive polymer (e.g., P2) or a charge transfer complex which transmits charge (electrons or holes) can be used.

The dimming layer 1 can be formed by preparing an application solution by dispersing the aforementioned dimming microparticles in a solution of binder resin, and further dissolving an electrically conductive material therein, and thereafter applying the application solution onto the electrode 3b by a spin coating technique, for example. The thickness of the dimming layer 1 is about 3 μm, for example. The formation of the dimming layer 1 may be performed by an ink jet technique or any other thin film deposition technique. The light incident-side face of the dimming layer 1 may be flat, or have bumps and dents. A dimming layer 1 having bumps and dents can be formed by using a substrate 4 or electrode 3b having bumps and dents and applying the aforementioned application solution onto the under layer having bumps and dents, for example.

The preferable thickness of the dimming layer 1 is no less than 1.5 μm and no more than 50 μm. If it is equal to or less than 1.5 μm, it may be impossible to obtain a dimming layer 1 having a high reflectance, or the grain size of the dimming microparticles used in the dimming layer 1 may be limited. On the other hand, if it is equal to or greater than 50 μm, the conductivity of the dimming layer 1 may be lowered.

The conversion layer 2 has a similar constitution to that of the conversion layer 2 in Embodiment 1, and may be formed by using a similar material.

In the present embodiment, similarly to Embodiment 1, the dimming device can be operated by applying a voltage to the electrodes 3a, 3b so as to induce a hydrogen movement between the conversion layer 2 and the dimming microparticles.

Preferably, the hydrogen storage/release is appropriately controlled by using a PTC characteristic curve shown in FIG. 4, as described in Embodiment 1. In other words, it is desirable that the conversion layer 2 and the dimming layer 1 exhibit substantially similar PTC characteristics. More specifically, as shown in FIG. 4, it is desirable that the ranges of "hydrogen storage amount" of the plateau regions of the PTC characteristic curves of the conversion layer 2 and the dimming layer 1 overlap each other, and that the "hydrogen equilibrium pressure" levels are substantially equal. Moreover, it is more preferable that the hydrogen storage amount range (span) of the plateau region of the PTC characteristic curve of the conversion layer 2 is of a size encompassing the hydrogen storage amount range (span) of the plateau region of the PTC characteristic curve of the dimming layer 1.

Embodiment 10

The dimming device of the present embodiment has a similar constitution to that of the dimming device of Embodiment 2 described with reference to FIGS. 5(a) to (c), except that the dimming layer 1 contains dimming particles. Utilizing the dimming principle illustrated in FIG. 1(b), the dimming device of the present embodiment is capable of switching between a metal diffuse reflection (white) state and an absorbing (black or colored) state.

The dimming layer 1 is similar to the dimming layer 1 used in Embodiment 9, for example. A conversion layer 2 having a light absorbing ability can also be formed from what is obtained (blended resin) by blending a potassium-graphite interlayer compound functioning as a hydrogen storage material and a conductive polymer material P1 (a material capable of transporting both charges, i.e., electrons and holes) with an acrylic resin functioning as a binder resin. Since the blended resin can be made into a solution, the conversion layer 2 can be formed by spin coating. The thickness of the conversion layer 2 may be prescribed to about 500 nm, for example.

In order to realize exchanges of charges and ions between the dimming layer 1 and the conversion layer 2, it is preferable to dispose a film of conductive polymer P1 between the dimming layer 1 and the conversion layer 2. Instead of disposing a polymer film having a charge moving ability, an electrolyte film may be disposed. By disposing an electrolyte film, movement of hydrogen ions becomes likely to occur via the electrolyte, and therefore it is possible to improve the characteristics.

Note that, in the dimming device of the constitution shown in FIG. 5(b), light enters from above the figure. In this case, the electrode 3a in the upper layer of the dimming layer 1 must be transparent, but the substrate 4 and the underlying electrode 3 do not need to be transparent.

For the dimming device shown in FIG. 5(a) and FIG. 5(b), when a voltage is applied to the electrodes 3a, 3b in such a manner that the conversion layer 2 is the positive side and the dimming layer 1 is the negative side, the dimming layer 1, which exhibited metal diffuse reflection in an initial state, gradually changes to a black state, as shown in FIG. 5(c). This is because, as the dimming microparticles contained in the dimming layer 1 become transparent, the black conversion layer 2 becomes visually perceivable. This state is retained even after power is terminated. On the other hand, if the electrode 3a and the electrode 3b are short-circuited, or if a voltage with an inverted polarity is applied to the electrodes 3a, 3b, the dimming layer 1 changes so as to exhibit metal diffuse luster.

Embodiment 11

Next, with reference to FIGS. 6(a) and (b), an eleventh embodiment of the dimming device according to the present invention will be described. The dimming device of the present embodiment has a similar constitution to that of Embodiment 3 described with reference to FIG. 6(a), except that the dimming layer 1 contains dimming microparticles. In other words, by utilizing the dimming principle shown in FIG. 1(b), the dimming device of the present embodiment is capable of switching between a metal diffuse reflection state and a black (light absorbing) state.

The dimming layer 1 and the conversion layer 2 in the present embodiment may be identical to the dimming layer 1 and conversion layer 2 in Embodiment 9. Moreover, the light absorbing plate 5 may be identical to the light absorbing plate 5 in Embodiment 3.

Figure 6:
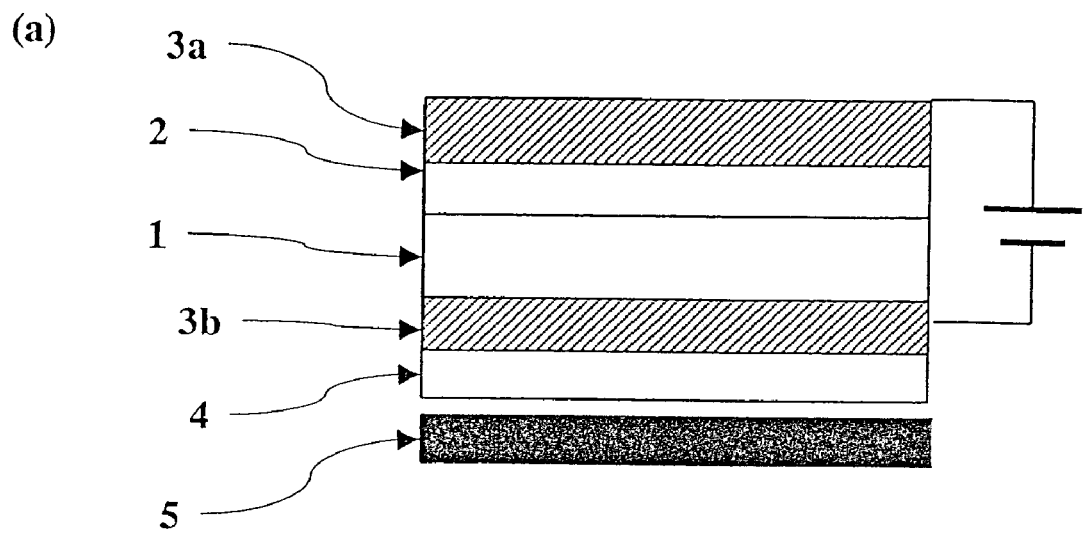
FIGS. 6(a) and (b) are cross-sectional views showing third and eleventh embodiments of the dimming device according to the present invention.
Figure 6:
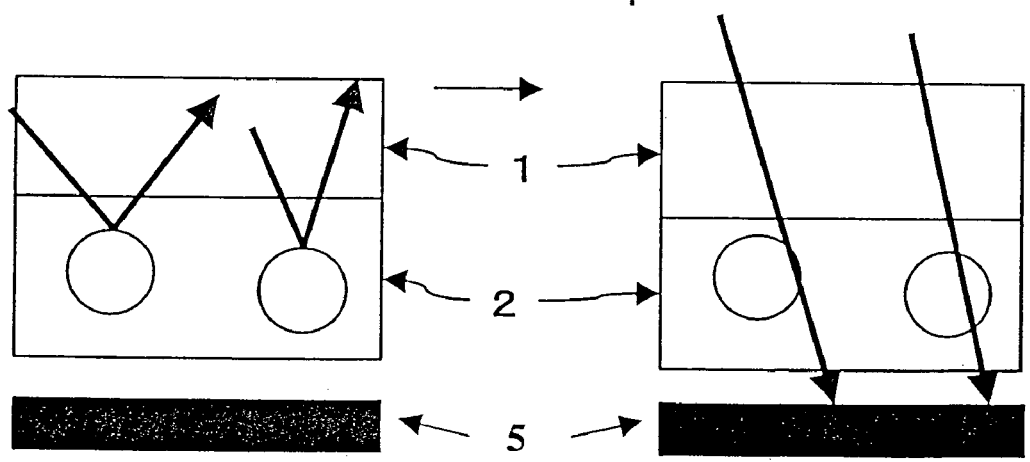

For the dimming device shown in FIG. 6(a), when a voltage is applied to the electrodes 3a, 3b in such a manner that the conversion layer 2 is the positive side and the dimming layer 1 is the negative side, the dimming layer 1, which exhibited metal diffuse reflection in an initial state, gradually changes to a black state, as shown in FIG. 6(b). This is because, as the dimming microparticles contained in the dimming layer 1 become transparent, the black conversion layer 2 becomes visually perceivable. This state is retained even after power is terminated. On the other hand, if the electrode 3a and the electrode 3b are short-circuited, or if a voltage with an inverted polarity is applied to the electrodes 3a, 3b, the dimming layer 1 changes so as to exhibit metal diffuse luster.

Embodiment 12

Next, a twelfth embodiment of the dimming device according to the present invention will be described. The dimming device of the present embodiment has a similar constitution to that of Embodiment 9 described with reference to FIG. 3. There is a difference in that the dimming layer 1 and the conversion layer 2 of the present embodiment utilize the dimming principle shown in FIG. 1(c). Therefore, without using a conversion layer 2 exhibiting light absorbing ability as in Embodiment 10, or without providing a light absorbing plate 5 as in Embodiment 11, it is possible to switching between a perform metal diffuse reflection (white) state and a light absorbing (black or colored) state.

Figure 3:
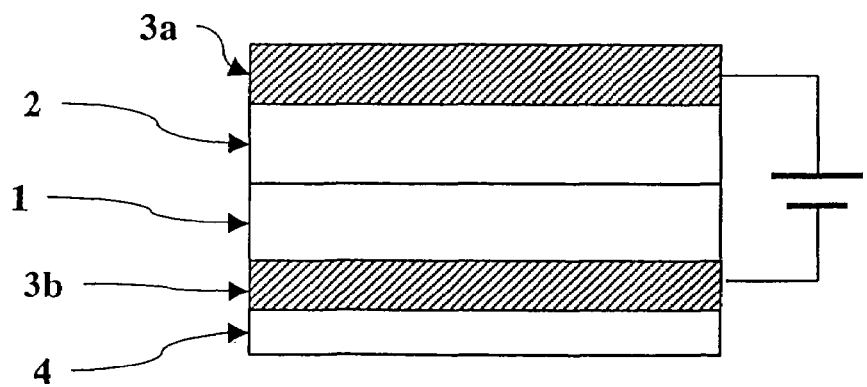
FIG. 3 is a cross-sectional view showing first, ninth, and twelfth embodiments of the dimming device according to the present invention.

As shown in FIG. 3, the dimming device of the present embodiment has a structure in which an electrode 3a, a dimming layer 1, a conversion layer 2, and an electrode 3b are layered in this order on a substrate 4. In this dimming device, light enters at the upper face of the substrate 4. Note that the layering order of the dimming layer 1 and the conversion layer 2 may be reversed, in which case light would enter at the rear face of the substrate 4.

The dimming layer 1 contains dimming microparticles (e.g., yttrium microparticles) similar to those used in Embodiment 9. The dimming microparticles are adsorbed to carbon-type black particles, for example.

Such a dimming layer 1 can be formed as follows, for example. In a solution of binder resin, black particles having a grain size of 5 μm and dimming microparticles having a smaller grain size (e.g., 1 μm) are mixed, and dimming microparticles are allowed to adsorb so as to cover the surface of the black particles. After a conductive polymer material P2 is further blended to the resultant solution, the resultant blend solution is applied onto the electrode 3b by a spin coating technique. The thickness of the dimming layer 1 is 10 μm, for example. Since the black particles are dispersed, the thickness of the dimming layer 1 is greater than the thickness of the dimming layer 1 in any other embodiment. However, since the carbon-type black microparticles and the dimming microparticles both exhibit a high conductivity, the entire dimming layer 1 has a sufficient conductivity.

For the dimming device of the present embodiment, when a voltage is applied to the electrodes 3a, 3b in such a manner that the conversion layer 2 is the positive side and the dimming layer 1 is the negative side, the light incident face of the dimming device, which exhibited metal diffuse reflection in an initial state, gradually changes to a black state. This is because, as the dimming microparticles adsorbed to the black particles become transparent, the black particles become visually perceivable. This state is retained even after power is terminated. On the other hand, if the electrode 3a and the electrode 3b are short-circuited, or if a voltage with an inverted polarity is applied to the electrodes 3a, 3b, the light incident-side face of the dimming device changes so as to exhibit metal diffuse luster.

Thus, in accordance with the dimming device of the present embodiment, when the dimming microparticles contained in the dimming layer 1 are in a metallic reflection state, reflected light is scattered so as to be perceived as white, whereby the surface of the dimming layer 1 appears white. On the other hand, when the dimming microparticles are in a transparent state, light is absorbed by the colored particles such as black particles, so that the surface of the dimming layer 1 appears black or in any other color. In other words, the dimming layer 1 itself transitions between a metal diffuse state and a light absorbing (colored) state. Therefore, in the present embodiment, without separately providing a layer having a light absorbing ability, e.g., an absorption plate, a dimming device which is capable of switching between a metal diffuse state ⇔ a light absorbing (colored) state can be provided.

The dimming device of the present embodiment can have a similar constitution to that of Embodiment 9, except that a dimming layer 1 containing colored particles as described above is used. However, the layers which are located closer to the light incident side than is the dimming layer 1 (i.e., the conversion layer 2 and the electrode 3a in the constitution of FIG. 3) are transparent. On the other hand, the layers which are not located closer to the light incident side than is the dimming layer 1 (i.e., the electrode 3b and the substrate 4 in the constitution of FIG. 3) do not need to be transparent.

Embodiment 13

With reference to FIGS. 13(a) and (b), a thirteenth embodiment of the dimming device according to the present invention will be described.

The dimming device of FIG. 13(a) has a constitution in which a conversion layer is separated into a plurality of layers, i.e., a first conversion layer 2a and a second conversion layer 2b. In the dimming device according to the present invention, the dimming layer 1 is doped with a specific element such as hydrogen, whereby the state of the dimming layer 1 is changed. Therefore, by adopting the constitution in which two conversion layers 2a, 2b sandwich the dimming layer 1, efficient doping becomes possible, whereby the speed of the state change necessary for dimming is improved. Since the dimming layer 1 can function as an electrode, the dimming layer 1 is used as an electrode in the example of FIG. 13(a).

In the dimming device of FIG. 13(a), the portion which performs hydrogen absorption/release has a three-layer structure including the first conversion layer 2a, the dimming layer 1, and the second conversion layer 2b, but may have even more layers. Even if sufficient dimming cannot be attained in the case where the dimming layer 1 is of a single layer, it would become possible to attain a sufficient dimming by increasing the number of layers in the dimming layer 1.

In the case where the dimming layer 1 has such a low conductivity that it cannot be used as an electrode, as shown in FIG. 13(b), the dimming layer may be separated into two layers, i.e., a first dimming layer 1a and a second dimming layer 1b, and an electrode 3c may be inserted between these dimming layers. In the dimming device of FIG. 13(b), too, the dimming layer 1 may have even more layers.

The dimming device of either FIG. 13(a) or (b) can be easily produced by sequentially stacking the respective layers. Note that the dimming layer, the conversion layer, the electrodes, and the substrate may have similar constitutions to those in Embodiments 9 to 12 except that the number of stacked layers may be different.

Embodiment 14

The dimming device of the present embodiment has a similar constitution to that of Embodiment 6 described with reference to FIG. 11. However, as the dimming layer 1, a dimming layer 1 having a structure as shown in FIG. 1(b) or (c) is used.

In the present embodiment, the conversion layer 2 is separated into a first conversion layer 2a and a second conversion layer 2b having different functions. The first and second conversion layers 2a, 2b may be formed from similar materials to those of the first and second conversion layers 2a, 2b in Embodiment 6.

Note that such separation of functions of the conversion layers can also be applied to the dimming device of any of Embodiments 9 to 13.

Embodiment 15

The dimming device of the present embodiment has a similar constitution to that of Embodiment 8 described with reference to FIG. 12. However, as the dimming layer 1, a dimming layer 1 having a structure as shown in FIG. 1(b) or (c) is used.

In the conversion layer 2 of the present embodiment, a material having photocharge generating characteristics is added. As a material having photocharge generating characteristics, any material exemplified in Embodiment 8 can be used. Moreover, the dimming device of the present embodiment can be allowed to operate by the control method described in Embodiment 8.

According to the present embodiment, the dimming amount can naturally be adjusted based on light irradiation. Therefore, there is an advantage in that electrodes 3a, 3b (e.g., FIG. 5) for applying a voltage to the dimming layer 1 and the conversion layer 2 are not necessary.

Embodiment 16

Hereinafter, with reference to FIG. 14 and FIG. 15, a sixteenth embodiment of the dimming device according to the present invention will be described.

Figure 14:
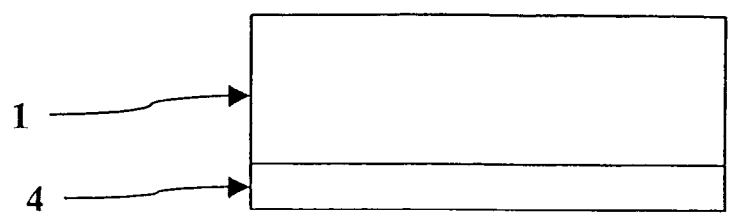
FIG. 14 is a cross-sectional view showing a sixteenth embodiment of the dimming device according to the present invention.

The present embodiment differs from the above-described embodiments in that, as shown in FIG. 14, only the dimming layer 1 is layered on the substrate 4, and no electrodes or conversion layer is comprised. The substrate 4 only needs to be a transparent substrate, and a substrate similar to that used in any other embodiment can be used.

Figure 15:
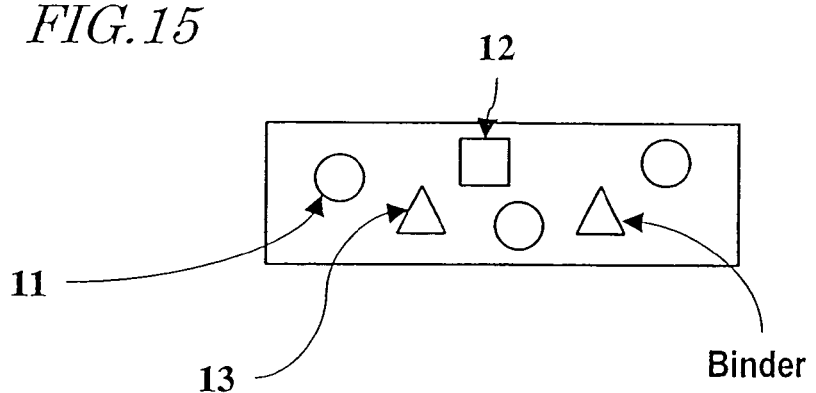
FIG. 15 is a cross-sectional view showing the sixteenth embodiment of the dimming device according to the present invention.

FIG. 15 shows a dimming layer 1 used in the dimming device of the present embodiment. The dimming layer 1 includes dimming microparticles 11, a material 12 having photocharge generating characteristics such as an Ru complex dye, and a conversion material 13 such as a hydrogen storage material. These are typically dispersed in a binder resin. Moreover, the dimming layer 1 contains an electrically conductive material for enabling hydrogen or electrons to move within the dimming layer 1. In the present embodiment, as a dimming material composing the dimming micropar-ticles 11, a material whose PTC characteristic curve shows, in its flat region, an equilibrium pressure which is greater than that of the conversion material 13 is selected. As the material 12 having photocharge generating characteristics, a similar material to that which is exemplified in Embodiment 7 can be used. As the conversion material 13, the same conversion material as that contained in the conversion layer in any other embodiment can be used. Thus, the dimming layer 1 contains all constituents that are necessary for causing optical modulation.

If the dimming device of the present embodiment is irradiated with light, the degree of metal diffuse reflection lowers when the light irradiation amount has reached a sufficient level, so that the dimming device begins to appear transparent. The reason is as follows. The electrons generated due to light irradiation induce a reduction reaction in the conversion material 13, and thus hydrogen is produced. When the resultant hydrogen exceeds the hydrogen equilibrium pressure in the conversion material 13, the hydrogen moves to the dimming microparticles 11, thus forming a hydrogenated compound with the dimming material of the dimming microparticles. When a hydrogenated compound is formed, the dimming microparticles 11 become transparent. As a result, the entire dimming device becomes transparent.

When light irradiation is stopped, the generation/supply of electrons stops, so that the state change of the dimming layer 1 also stops. Since a difference in hydrogen equilibrium pressure has occurred, the equilibrium state shifts toward the conversion material 13, and most of the hydrogen which has moved to the dimming microparticles 11 can again move to the conversion material 13.

Thus, according to the present embodiment, the dimming amount can naturally be adjusted based on light irradiation.

In the present embodiment, too, as in Embodiment 15, it would also be possible to control the hydrogen equilibrium state in accordance with intensity of irradiation light or a cumulative value of irradiation amounts to realize dimming. Moreover, by additionally disposing electrodes, it would become possible to adjust the hydrogen doped amount.

Embodiment 17

Hereinafter, with reference to FIG. 14 and FIG. 16, a seventeenth embodiment of the dimming device according to the present invention will be described.

As shown in FIG. 14, in the dimming device of the present embodiment, only the dimming layer 1 is layered on the substrate 4, and no electrodes or conversion layer is comprised. In the present embodiment, the substrate 4 only needs to be able to support the dimming layer 1, and does not need to be transparent.

Figure 16:
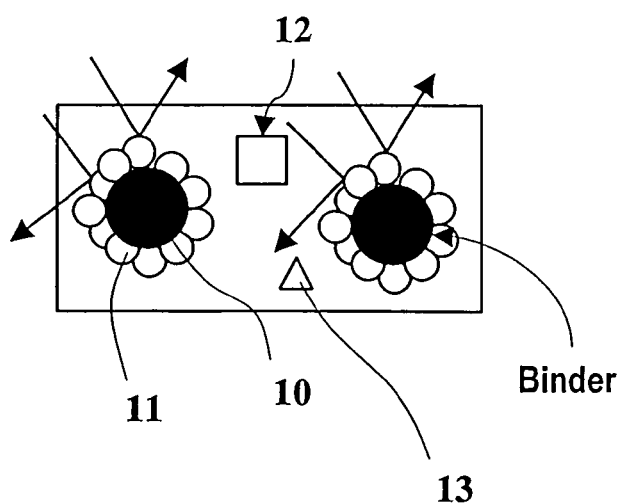
FIG. 16 is a cross-sectional view showing a seventeenth embodiment of the dimming device according to the present invention.

FIG. 16 shows a dimming layer 1 used in the dimming device of the present embodiment. In the dimming layer 1, colored particles (e.g., black particles) 10 are dispersed in a binder resin, with dimming microparticles 11 being adsorbed to the colored particles 10. Other than that, a material 12 having photocharge generating characteristics such as an Ru complex dye and a conversion material 13 such as a hydrogen storage material are dispersed in the binder resin. Furthermore, the dimming layer 1 contains an electrically conductive material for enabling hydrogen or electrons to move within the dimming layer 1. In the present embodiment, as a dimming material composing the dimming microparticles 11, a material whose PTC characteristic curve shows, in its flat region, an equilibrium pressure which is greater than that of the conversion material 13 is selected. As the material 12 having photocharge generating characteristics, a similar material to that which is exemplified in Embodiment 7 can be used. As the conversion material 13, the same conversion material as that contained in the conversion layer in any other embodiment can be used. Thus, the dimming layer 1 contains all constituents that are necessary for causing optical modulation.

In the present embodiment, as the colored particles 10, black particles of a potassium-graphite interlayer compound are used. Thus, it is preferable if the colored particles 10 are particles which can also function as a conversion material because then it would be unnecessary to separately add the conversion material 13 to the dimming layer 1. Moreover, since the dimming microparticles 11 are adsorbed to the colored particles 10, which are the conversion material, the time required for hydrogen to move between the dimming material and the conversion material is short. Therefore, as compared to the case where hydrogen moves within the binder resin, the optical characteristics of the dimming layer 1 can be switched rapidly.

If the dimming device of the present embodiment is irradiated with light, the degree of metal diffuse reflection lowers when the light irradiation amount has reached a sufficient level, so that the dimming device begins to assume the color of the colored particles 10, e.g., black. This happens because, the electrons generated due to light irradiation induce a reduction reaction in the conversion material (i.e., the conversion material 13, or the colored particles 10 in the case where the colored particles 10 are formed by using a conversion material), and the resultant hydrogen exceeds the hydrogen equilibrium pressure in the conversion material. The hydrogen moves from the conversion material to the dimming microparticles 11 to form a hydrogenated compound with the dimming material of the dimming microparticles 11, thus making the dimming microparticles 11 transparent. As a result, the color of the colored particles 10 is visually perceived, whereby the entire dimming device assumes the color of the colored particles 10.

When light irradiation is stopped, the generation/supply of electrons stops, so that the state change of the dimming layer 1 also stops. Since a difference in hydrogen equilibrium pressure has occurred, the equilibrium state shifts toward the conversion material, and most of the hydrogen which has moved to the dimming microparticles 11 can again move to the conversion material.

Thus, according to the present embodiment, the dimming amount can naturally be adjusted based on light irradiation.

In the present embodiment, too, as in Embodiment 15, it would also be possible to control the hydrogen equilibrium state in accordance with intensity of irradiation light or a cumulative value of irradiation amounts to realize dimming. Moreover, by additionally disposing electrodes, it would become possible to adjust the hydrogen doped amount.

Embodiment 18

First, with reference to the figures, an eighteenth embodiment of the present invention will be described. The present embodiment is directed to a display device utilizing the above-described dimming principle.

Figure 17:
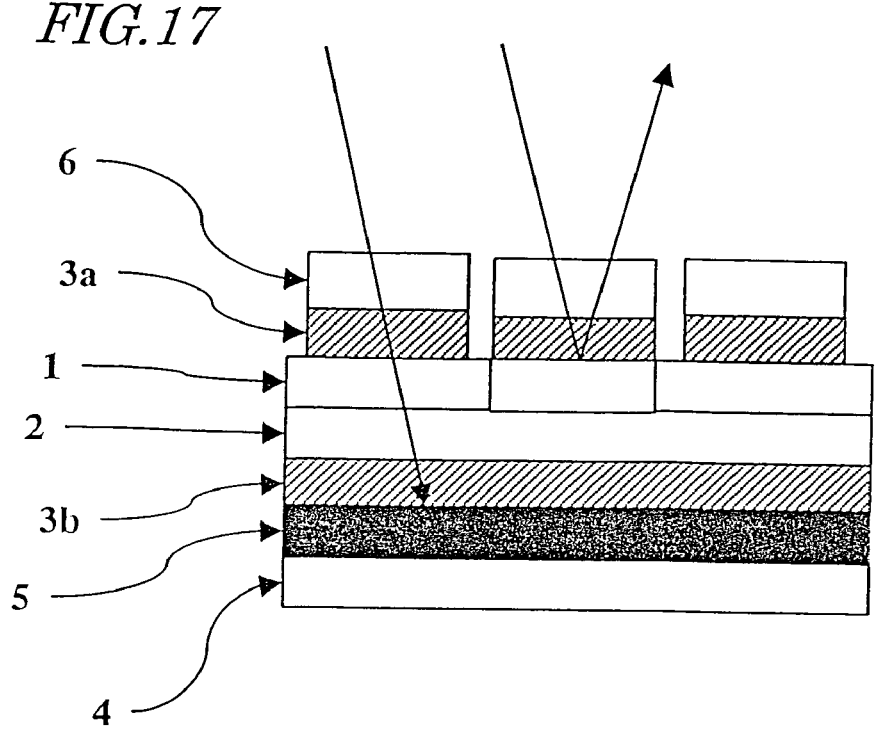
FIG. 17 is a cross-sectional view showing an eighteenth embodiment of the display device according to the present invention.
Figure 18:
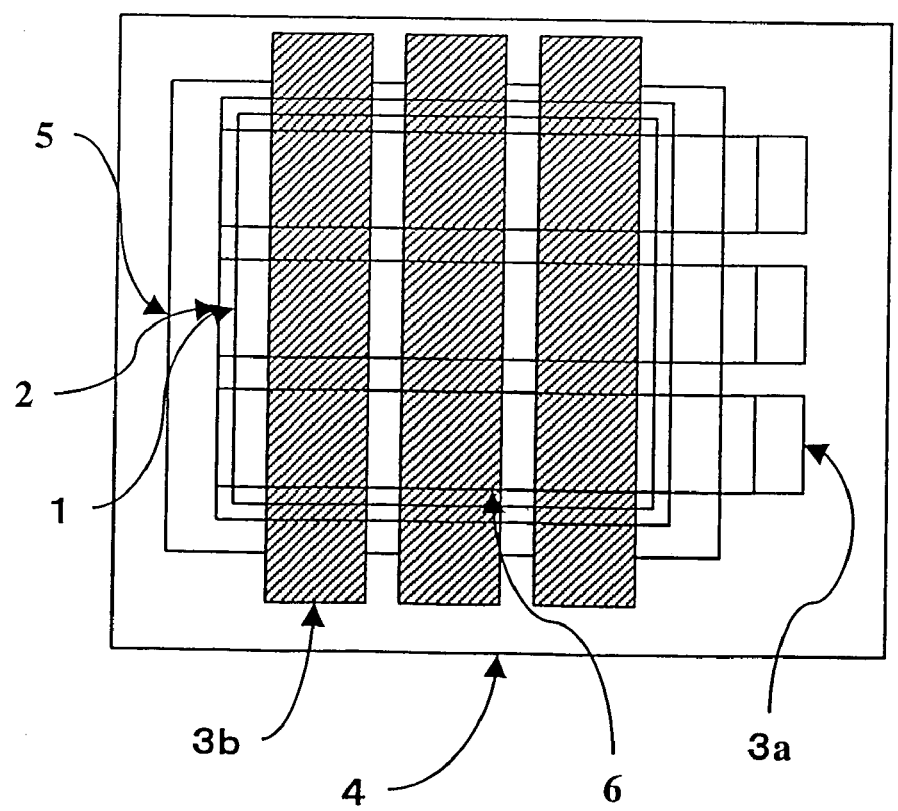
FIG. 18 is a plan view showing the eighteenth embodiment of the display device according to the present invention.

FIG. 17 shows a schematic cross-sectional view of one pixel of the display device of the present embodiment. FIG. 18 shows a plan view of the display device of the present embodiment. Although a reflection type full-color display device will herein be illustrated for instance, the present invention is not limited thereto. For example, it may be a monochrome display device or a projection type display device.

The display device of the present embodiment includes a light absorbing layer 5, electrodes 3b, a conversion layer 2, a dimming layer 1, electrodes 3a, and color filters 6 layered in this order on a substrate 4. As shown in FIG. 18, the electrodes 3b include a plurality of patterns extending in parallel, whereas the electrodes 3a include a plurality of patterns extending in a direction perpendicular to the electrodes 3b. An appropriate voltage can be applied to each pair of electrodes 3a, 3b. However, it would also be possible to simply short-circuit the electrodes 3a and electrodes 3b as necessary. The color filters 6 include a plurality of patterns extending substantially in parallel to the electrodes 3a. Among these patterns, typically three patterns of R(red), G(green), and B(blue) are formed for each pixel.

Note that the layering order of the conversion layer 2 and the dimming layer 1 with respect to the substrate 4 is not limited to that which is illustrated in the figures, but the conversion layer 2 may be disposed so as to be closer to the substrate 4, with the dimming layer 1 being formed thereupon. If the substrate 4 is a transparent substrate such as a glass substrate, the light absorbing layer 5 may be provided on the rear face of the substrate 4. In the case where the light absorbing layer 5 has conductivity, the light absorbing layer 5 may be provided anywhere between the electrodes 3a and the electrodes 3b. Alternatively, a light absorbing layer 5 having conductivity can be used in an integral manner with the electrodes 3b, or so as to replace the electrodes 3b.

The dimming layer 1 in the present embodiment contains a dimming material (e.g., yttrium) whose optical characteristics change in accordance with the hydrogen concentration. In the present embodiment, the dimming layer 1 is a film (e.g., a yttrium film) formed by using a dimming material as shown in FIG. 1(a). The dimming layer 1 may be a single layer or have a multi-layer structure.

The conversion layer 2 contains a conversion material which is capable of containing hydrogen. This conversion material performs exchanges of electrons with the electrodes 3a, thus effecting release/absorption of hydrogen ions ($H^+$).

In the illustrated example, a voltage can be applied to the conversion layer 2 in any arbitrary pixel by means of the matrix-shaped electrodes 3a and 3b. In a given pixel, by applying a positive potential to the electrode 3a and a negative potential to the electrode 3b, hydrogen ions are released from the conversion material in the conversion layer 2 containing a sufficient amount of hydrogen in advance. The released hydrogen ions move within an electric field which is generated in the layered structure, and reach the dimming layer 1, thus leaving the dimming material doped therewith. Such a mechanism of hydrogen release and movement is as described above. The dimming material in the dimming layer 1 bonds to hydrogen, thus forming a hydrogen metal compound. As a result, the dimming material, which was initially in a metallic state, changes to a semiconductor or insulator that transmits visible light.

Figure 19:
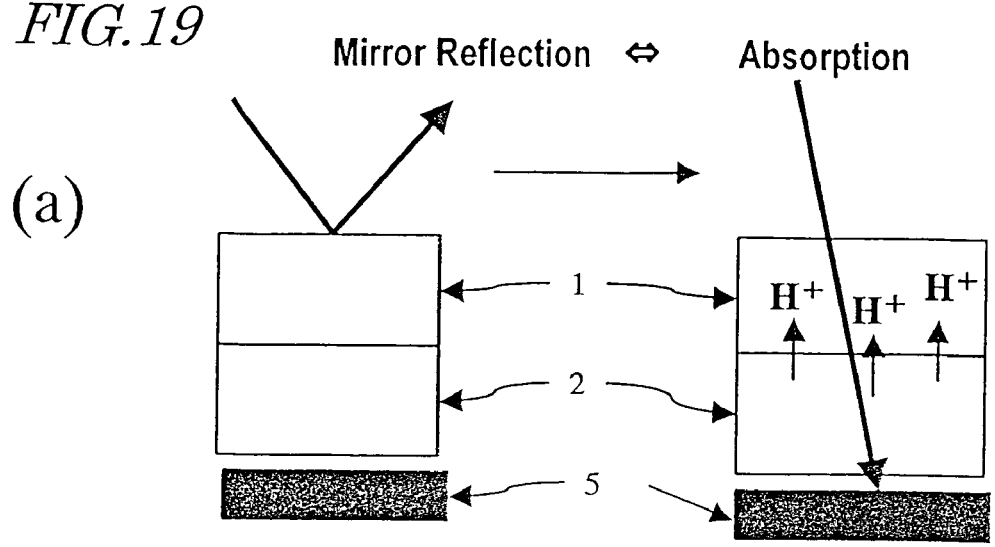
FIGS. 19(a) to (c) are cross-sectional views showing a dimming layer and a conversion layer in the eighteenth embodiment of the present invention.
Figure 19:
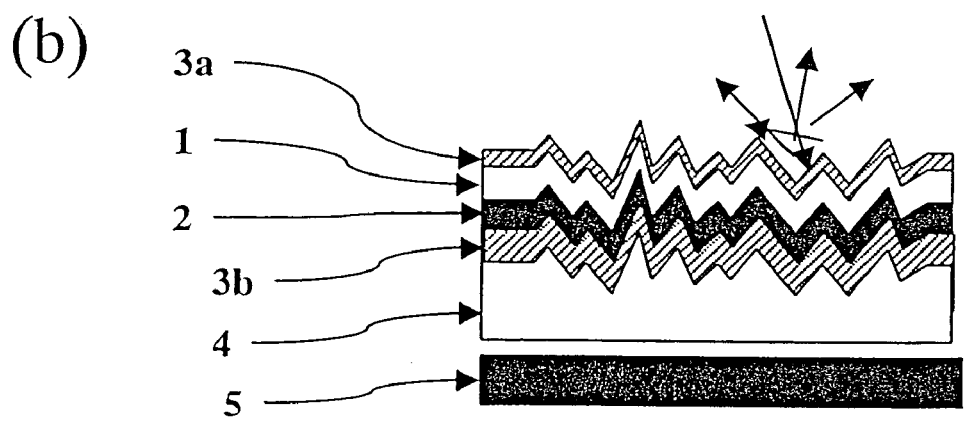
Figure 19:
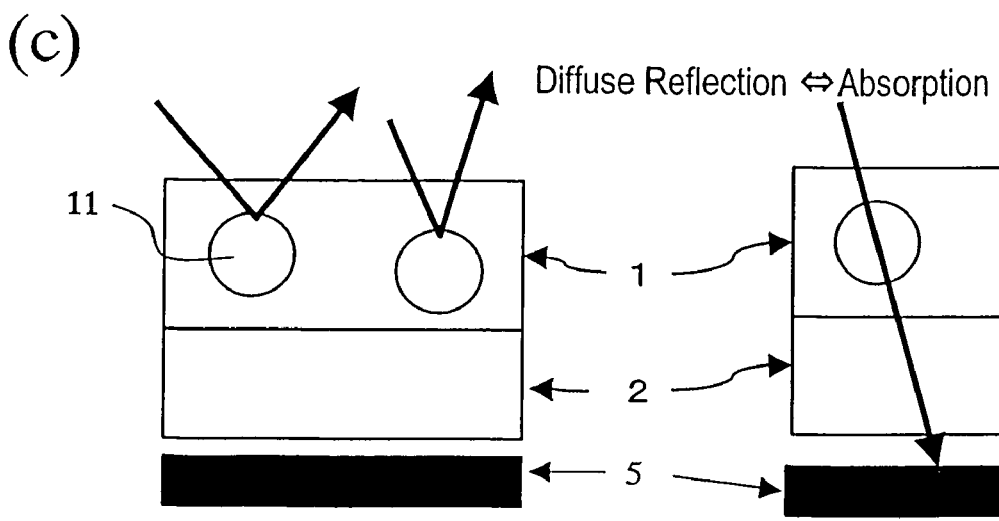

The aforementioned changes in the states of the dimming layer 1 and the conversion layer 2 are shown in FIG. 19(a). When the dimming material in the dimming layer 1 is in a metallic state, light entering the display device is reflected from the dimming layer 1, thus being transmitted through the color filter 6. Therefore, the light which has been transmitted through the color filter 6 is visually perceived. When the dimming material becomes a semiconductor or an insulator, the dimming layer 1 becomes transparent, and therefore the light entering the display device is transmitted through the dimming layer 1 and absorbed by the light absorbing layer 5. As a result, black is visually perceived.

Next, a method of producing the display device of the present embodiment will be described.

First, the substrate 4 is prepared. The substrate 4 only needs to be able to support the layered structure formed on the substrate 4, and a glass substrate, a plastic substrate, or a metal substrate may be used. The substrate 4 does not need to be transparent.

The light absorbing layer 5 is formed on the substrate 4. The light absorbing layer 5 may be a layer (black) that absorbs light in the entire visible light region, or a layer (any other color) that absorbs light in a part of the visible light region. The formation of the light absorbing layer 5 is performed by applying a black resin containing a carbon black-type black material onto the substrate 4 by a spin coating technique, for example.

Thereafter, electrodes are formed on the light absorbing layer 5. For example, by using ITO (Indium Tin Oxide), a film having a thickness of 150 nm is formed by a sputtering technique. This film is patterned into a plurality of patterns having a width of 100 µm (corresponding to the width of the pixel). These patterns are substantially parallel to one another, with an interspace of 10 µm present between adjoining patterns.

On the electrodes 3b, the transparent conversion layer 2 is formed. The conversion material contained in the conversion layer 2 can store and retain atoms or ions of hydrogen in its stationary state, and changes its hydrogen storage amount (retained amount) in accordance with external stimulations. As this material capable of storing hydrogen, those materials exemplified in Embodiment 1 can be used.

The conversion layer 2 may contain an electrically conductive material in addition to the hydrogen storage material. As the electrically conductive material, those materials exemplified in Embodiment 1 can be used. To the conversion layer 2, a bonding material such as a binder resin may be added as necessary, in addition to the aforementioned hydrogen storage material and electrically conductive material.

The charge which has been injected from the electrodes 3a, 3b undergoes charge exchanges in the dimming layer 1 and the conversion layer 2. Since the charge which has been injected from one of the electrodes may immediately move to the other electrode, a layer to serve as a separator (separate layer), e.g., an ion exchange film, may be disposed between the dimming layer 1 and the conversion layer 2. It is desirable that the separate layer is formed from a material which permits ion movement but is unlikely to permit charge movement within the layer. Examples of such materials are an ion exchanger, a porous insulator, and an ion conductive polymer material. By disposing a separator layer, the charge which has been injected from an electrode is restrained from penetrating to the other electrode. As a result, in the dimming layer 1 and the conversion layer 2, the proportion of the charge (out of the injected charge) which is used for the exchanges with hydrogen ions is increased, so that an efficiently exchange can be realized.

In the present embodiment, the conversion layer 2 is formed as follows. There is used a blend of: ultrafine particles (dispersion center radius: 10 nm) of an Ni alloy, which is an AB5 type Mm hydrogen storage alloy; a conductive polymer material P1 (a material capable of transporting both charges, i.e., electrons and holes); and, as a binder resin, an acrylic resin having about the same refractive index as that of glass. A solution obtained by dissolving these materials into a solvent is prepared, and applied by a spin coating technique or a printing technique, whereby a conversion layer 2 having a thickness of 500 nm, for example, can be formed. Such formation of the conversion layer 2 may be performed by an ink jet technique or any other thin film deposition technique.

Next, the dimming layer 1 is formed by a vapor deposition technique, a sputtering technique, or the like. The dimming layer 1 is a yttrium film having a thickness of 50 nm, for example.

Thereafter, the electrodes 3a and the color filters 6 are sequentially formed. The electrodes 3a are transparent. By using ITO, the electrodes 3a can be formed by a similar method to the method of forming the electrodes 3b. However, as shown in FIG. 4, the patterns of the electrodes 3a are formed so as to extend in a direction substantially perpendicular to the direction in which the patterns of electrodes 3b extend. The pattern width and the interspace between adjoining patterns are, for example, 100 µm and 10 µm, respectively. The color filters 6 are formed from a known material, for example, by using a known method such as a printing technique. As shown in FIG. 4, the color filters 6 include a plurality of patterns having the same width as the width of the patterns of electrodes 3b. Thus, a display device is obtained.

Exchanges of charges and ions occur inside the conversion layer 2 responsive to application of a voltage to the electrodes 3a, 3b of the display device. As a result, as has been described in Embodiment 1, hydrogen movement can be induced between the conversion layer 2 and the dimming layer 1. A dimming layer 1 which is undoped with hydrogen in an initial state and a conversion layer 2 having hydrogen stored in advance may be used, or a dimming layer 1 which is doped with hydrogen in advance and a conversion layer 2 having no hydrogen stored therein may be used. As described in Embodiment 1, by reversing the polarity of the applied voltage, the optical state of the dimming layer 1 can be reversibly switched between metallic luster and transparent.

When only contemplating a movement of the hydrogen stored in the conversion layer 2, the electrodes 3a and the electrodes 3b might be short-circuited outside of the layered structure. Such short-circuiting would be a similar phenomenon to a discharging of a secondary battery, and enable restoration of the internal state of the layered structure to the initial state.

Since the conversion layer 2 and the dimming layer 1 have the ability to retain hydrogen, when voltage application is not performed (when the external circuit is open), no hydrogen movement occurs, so that the optical state of the dimming layer 1 is retained (memory function of the dimming layer). Therefore, by choosing a material having a good hydrogen retaining ability, it becomes possible to retain a dimmed state for a long period of time without consuming power.

In the present embodiment, the light reflectance/light transmittance of a dimming material can be controlled based on a doping amount of hydrogen. Therefore, by controlling the voltage to be applied to the electrode and application time (e.g., a duty ratio), the light reflectance/light transmittance of the dimming layer 1 can be controlled. By utilizing the memory ability based on hydrogen retaining ability, an appropriate light reflectance/light transmittance can be easily retained.

Preferably, the hydrogen storage/release is appropriately controlled by using a PTC characteristic curve shown in FIG. 4, as described in Embodiment 1. In other words, it is desirable that the conversion layer 2 and the dimming layer 1 exhibit substantially similar PTC characteristics. More specifically, as shown in FIG. 4, it is desirable that the ranges of "hydrogen storage amount" of the plateau regions of the PTC characteristic curves of the conversion layer 2 and the dimming layer 1 overlap each other, and that the "hydrogen equilibrium pressure" levels are substantially equal. Moreover, it is more preferable that the hydrogen storage amount range (span) of the plateau region of the PTC characteristic curve of the conversion layer 2 is of a size encompassing the hydrogen storage amount range (span) of the plateau region of the PTC characteristic curve of the dimming layer 1.

FIG. 17 is referred to again. The conversion layer 2 of the display device shown in FIG. 17 may be transparent. As a result, it becomes possible to perform switching between a metallic reflection state and a transparent state. A conversion layer 3 having a high transparency can be formed by a method similar to the method described in Embodiment 1, for example.

Although the dimming layer 1 may mirror-reflect the incident light in a metallic reflection state (FIG. 19(a)), the dimming layer 1 preferably diffuse-reflects the incident light. If the dimming layer 1 diffuse-reflects light, the display device will display white well.

In order for the dimming layer 1 to diffuse-reflect light in a metallic reflection state, minute bumps and/or dents may be present on the surface of the dimming layer 1, for example (FIG. 19(b)), or the dimming layer 1 may contain dimming particles as shown in FIG. 1(b) (FIG. 19(c)).

First, a dimming layer 1 having minute bumps and/or dents on the surface will be described in detail.

A dimming layer 1 having minute bumps and/or dents on the surface can be formed as follows, for example. As shown in FIG. 19(b), on a substrate 4 having bumps, electrodes 3a, a conversion layer 2, a dimming layer 1, and electrodes 3b are layered in this order. The dimming layer 1 is a yttrium film, for example. Thus, minute bumps can be formed on the surface of the dimming layer 1. If minute bumps are present on the surface of the dimming layer 1, the reflected light is scattered and perceived as white while the dimming layer 1 is in a metallic reflection state, so that the surface of the dimming layer 1 will appear white. On the other hand, while the dimming layer 1 is in a transparent state, the conversion layer 2 absorbs light, thus appearing to be black or in any other color.

In the example shown in FIG. 19(b), the surface of the substrate has minute bumps, and therefore the conversion layer 2 and the dimming layer 1 are of such an overall planarity that the bumps and dents of the substrate are reflected in their shapes. In other words, not only the upper face (the face on the light reflecting side) of the dimming layer 1, but also the bottom face has a shape reflecting the underlying bumps and dents. However, it is not necessary for the underlying conversion layer 2 to have a bump/dent structure. Therefore, minute dents and/or bumps may be formed only on the upper face of the dimming layer 1, while the substrate surface and the conversion layer 2 may be formed flat.

Thus, when flat, a metal film such as a yttrium film mirror-reflects light; however, when bumps and dents are provided on the surface of the metal film, the metal film will become a dimming layer 1 which diffuse-reflects light. As a result, a display device which is capable of displaying white can be provided. Such a display device is not limited to a color display device having the constitution as shown in FIG. 3, but may be a monochrome display device in which no color filters 6 are provided. When applied to a monochrome display device, there is provided an advantage in that a better white display can be achieved.

Next, a dimming layer 1 containing dimming particles will be described in detail.

A dimming layer 1 containing dimming particles and a conversion layer 2 are shown in FIG. 19(c). In the dimming layer 1 shown in FIG. 19(c), dimming microparticles 11 (e.g., yttrium or lanthanum), which are formed by using a dimming material whose optical characteristics change in accordance with hydrogen concentration, are dispersed in a binder resin. The average grain size of the dimming microparticles 11 contained in the dimming layer 1 is 1 µm, for example. As a binder resin, an acrylic resin having about the same refractive index as that of glass is used. Moreover, the dimming layer 1 further contains an electrically conductive material for performing exchanges of hydrogen ions and charge between the dimming microparticles 11 and the conversion layer 2. As the electrically conductive material, a material capable of ion transmission, such as a liquid or solid electrolyte, or a conductive polymer (e.g., P2) or a charge transfer complex which transmits charge (electrons or holes) can be used.

A dimming layer 1 containing dimming particles has a similar constitution to that of the dimming layer 1 in Embodiment 9, and can be formed by a similar method. Note that the thickness of the dimming layer 1 is preferably no less than 1.5 µm and no more than 50 µm.

If dimming microparticles 11 are dispersed in the dimming layer 1, as has been described with reference to FIG. 1(b), while each dimming microparticles 11 is in a metallic state, the dimming microparticles 11 cause light entering the dimming layer 1 to be reflected in random directions. As a result, the dimming layer 1 as a whole can diffuse-reflect light.

Other than diffuse-reflection being achieved by the dimming layer 1, the following advantages are obtained by making the dimming material into particles. The surface area of the dimming material can be made greater than in the case of using a thin film of dimming material as the dimming layer 1. Therefore, the reaction efficiency between the dimming material and hydrogen is improved, and a rapider switching becomes possible. Since the surface area of the dimming material is increased, the state of the dimming material contained in the dimming layer 1 can be more surely controlled. As a result, the difference in reflectance between a diffuse-reflection state and a transparent state of the dimming layer can be enlarged.

In order for the dimming microparticles 11 to reflect light, it is desirable that each dimming microparticle 11 has a grain size greater than the visible light wavelength. Therefore, the dimming microparticles 11 preferably have a grain size of 400 nm or more, and more preferably 800 nm or more. If it is 800 nm or more, transmission of visible light through the dimming microparticles 11 can be more surely prevented, so that the light reflectance of the dimming layer 1 can be enhanced. On the other hand, the grain size of the dimming particles m1 is preferably smaller than the thickness of the dimming layer 1. If the grain size is greater than the thickness of the dimming layer 1, the aforementioned advantage associated with making the dimming material into particles cannot be obtained. More preferably, the grain size of the dimming microparticles 11 is 30 µm or less. If the grain size is 30 µm or less, the reaction efficiency between the dimming material and hydrogen can be made sufficiently high, and the light entering the dimming layer can be surely diffuse-reflected. More preferably, the grain size is 3 µm or less. When the grain size of the dimming material is 1 µm, for example, the dimming layer 1 preferably has a thickness of about 3 µm.

In the display device of the present embodiment, in order to realize exchanges of charges and ions between the dimming layer 1 and the conversion layer 2, it is preferable to dispose a film of conductive polymer P1 between the dimming layer 1 and the conversion layer 2. In addition to a polymer film having a charge moving ability, a layer formed by using an electrolyte material may be disposed. Alternatively, a layer containing a polymer material having a charge moving ability and an electrolyte material may be disposed. By disposing a layer containing an electrolyte material (electrolyte film), movement of hydrogen ions becomes likely to occur via the electrolyte film, and therefore it is possible to improve the characteristics. The conductive polymer P1 is doped with ions for conferring conductivity, and therefore also functions as an electrolyte film. Note that, in the case where a dimming layer 1 containing dimming particles as above is used, the binder resin in the dimming layer 1 can be allowed to function as the aforementioned polymer film or electrolyte film.

In the illustrated example, the conversion layer 2 and the dimming layer 1 are each composed of a single layer. However, the conversion layer 2 and/or the dimming layer 1 may have a multi-layer structure as necessary. If the dimming layer 1 is interposed between two conversion layers 2, hydrogen absorption/release will be performed at the upper face and the lower face of the dimming layer 1, so that the switching speed of the display device can be increased.

Moreover, although the display device shown in FIG. 17 has a simple matrix structure, it may be an active matrix driving display device which has an active device for each pixel. Furthermore, although the display device shown in FIG. 17 is a color display device comprising color filters 6, it may be a monochrome display device. A monochrome display device basically would have a similar constitution to the constitution shown in FIG. 17, but differ in that no color filters 6 are comprised.

The display device of the present embodiment can display a very bright (high-luminance) white color, as compared to conventional liquid crystal display devices. Moreover, the contrast ratio can be increased. The reasons are described below.

A liquid crystal display device includes polarizer plates in order to visualize changes in the orientations of liquid crystal molecules responsive to voltage applications. Therefore, out of the light entering the liquid crystal device, the proportion of the light which is utilized for displaying is, at the most, 50%. Therefore, there is a problem in that white becomes particularly dark, thus making it difficult to visually perceive the display. On the other hand, the display device of the present embodiment does not require polarizer plates. Therefore, since the light which has experienced metallic reflection (or metal diffuse reflection) at the dimming layer 1 is directly observed through the color filters 6, whereby bright white can be displayed. On the other hand, when the dimming layer 1 is in a light transmitting state, the color of the light absorbing layer 5 is directly observed, whereby a very high quality black display can be obtained. As a result, the contrast ratio of the display can be increased.

Since the display device of the present embodiment has a memory ability, any information which has once been written is retained even after power is terminated. Therefore, a voltage needs to be applied only when it is necessary to perform a rewrite, so that power consumption can be reduced.

Furthermore, the display device of the present embodiment can be produced simply by sequentially stacking the respective layers on a substrate. Therefore, there is no step of attaching together two substrates and injecting a liquid crystal material therebetween as in the case of a liquid crystal display device, so that the production process is easy. Moreover, since the display device of the present embodiment does not include a liquid crystal layer, it can be made thinner and lighter than a liquid crystal display device.

The display device of the present embodiment is applicable to various types of display apparatuses. For example, since the display device of the present embodiment has a high memory ability, it can be applied to electronic paper, electronic books, or the like.

Embodiment 19

Figure 20:
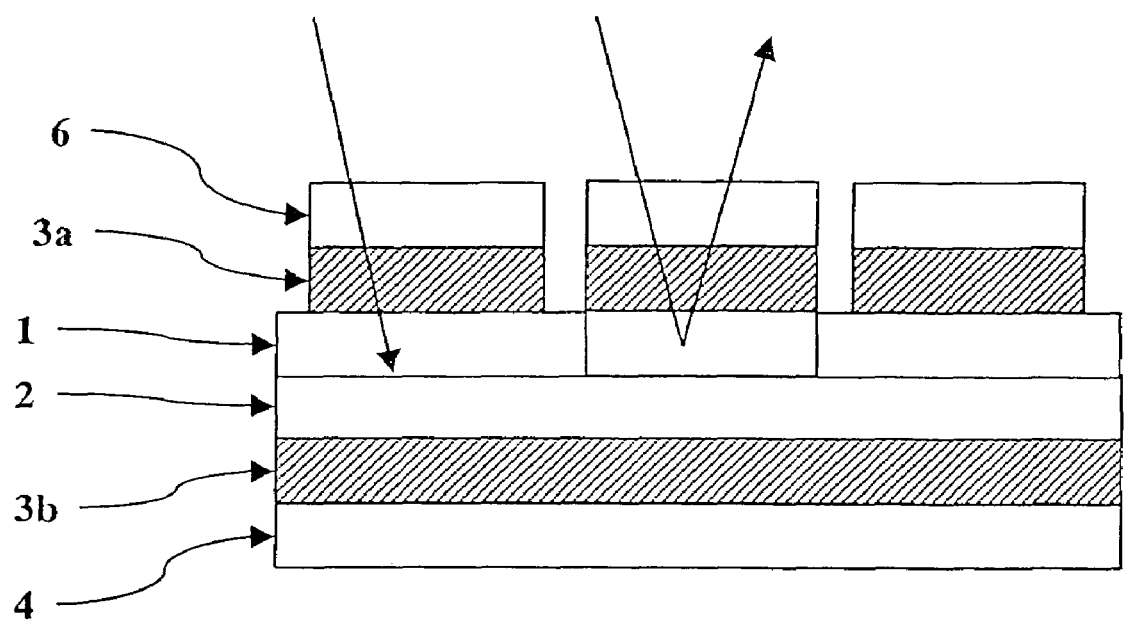
FIG. 20 is a cross-sectional view showing a nineteenth embodiment of the display device according to the present invention.

Hereinafter, with reference to FIG. 20, a nineteenth embodiment of the display device according to the present invention will be described. As shown in FIG. 20, the display device of the present embodiment differs from the display device of Embodiment 18 above in that the conversion layer 2 has the function of a light absorbing layer and therefore no light absorbing layer is present between the substrate 4 and the electrodes 3b.

The display device of the present embodiment comprises a conversion layer 2 which absorbs visible light. Such a conversion layer 2 can be formed from a black CNT, for example. Note that, in the case where the conversion layer 2 is colored, or even in the case where the conversion layer 2 is transparent, if a pigment or a colored resin is mixed therein, switching between a metal diffuse reflection state and a colored state is possible.

A conversion layer 2 having a light absorbing ability can also be formed from what is obtained (blended resin) by blending a potassium-graphite interlayer compound functioning as a hydrogen storage material and a conductive polymer material P1 (a material capable of transporting both charges, i.e., electrons and holes) with an acrylic resin functioning as a binder resin. Since the blended resin can be made into a solution, the conversion layer 2 can be formed by spin coating. The thickness of the conversion layer 2 may be prescribed to about 500 nm, for example. Note that, in the case where the conversion layer 2 cannot sufficiently absorb light, a black resin may further be added to the conversion layer 2.

The dimming layer 1 is similar to the dimming layer 1 used in Embodiment 18, for example. In other words, it may be a yttrium film having a thickness of about 50 nm, or a film including particles of dimming material such as yttrium particles. Moreover, it may have minute dents and/or bumps on the surface.

In order to realize exchanges of charges and ions between the dimming layer 1 and the conversion layer 2, it is preferable to dispose a film of conductive polymer P1 between the dimming layer 1 and the conversion layer 2. In addition to a polymer film having a charge moving ability, a layer formed by using an electrolyte material may be disposed. Alternatively, a layer containing a polymer material having a charge moving ability and an electrolyte material may be disposed. By disposing a layer containing an electrolyte material (electrolyte film), hydrogen ions will move via the electrolyte film, and therefore it is possible to improve the characteristics. The conductive polymer P1 is doped with ions for conferring conductivity, and therefore also functions as an electrolyte film. Note that, in the case where a dimming layer 1 containing particles of dimming material is used, the binder resin can be allowed to function as the aforementioned polymer film or electrolyte film.

The electrodes 3a are transparent electrodes as in the case of Embodiment 18, but the electrodes 3b and the substrate 4 do not need to be transparent.

Figure 21:
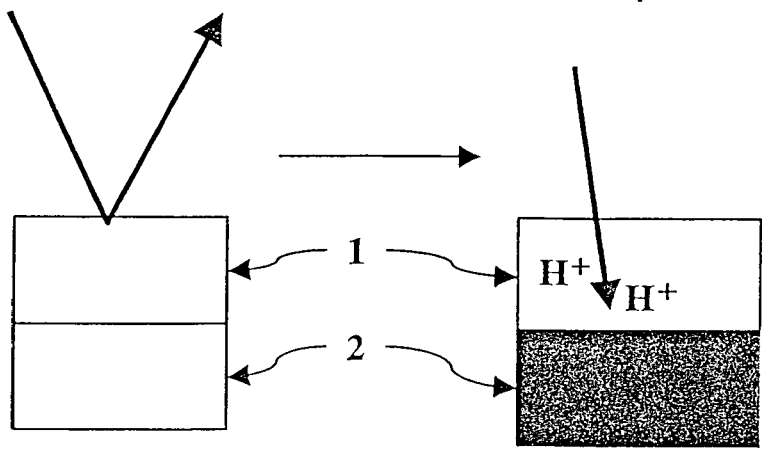
FIGS. 21(a) to (c) are cross-sectional views showing a dimming layer and a conversion layer in a nineteenth embodiment of the present invention.
Figure 21:
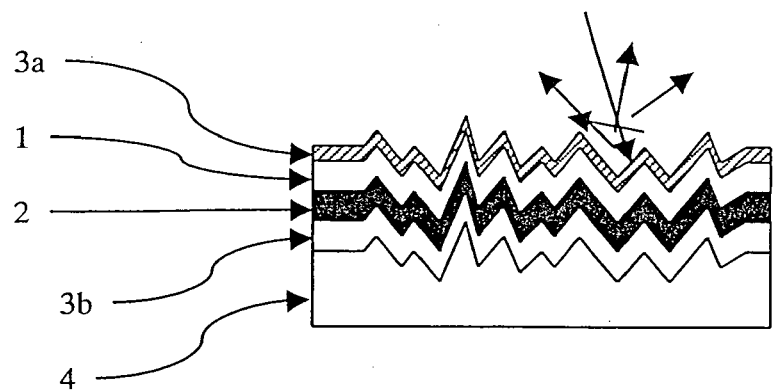
Figure 21:
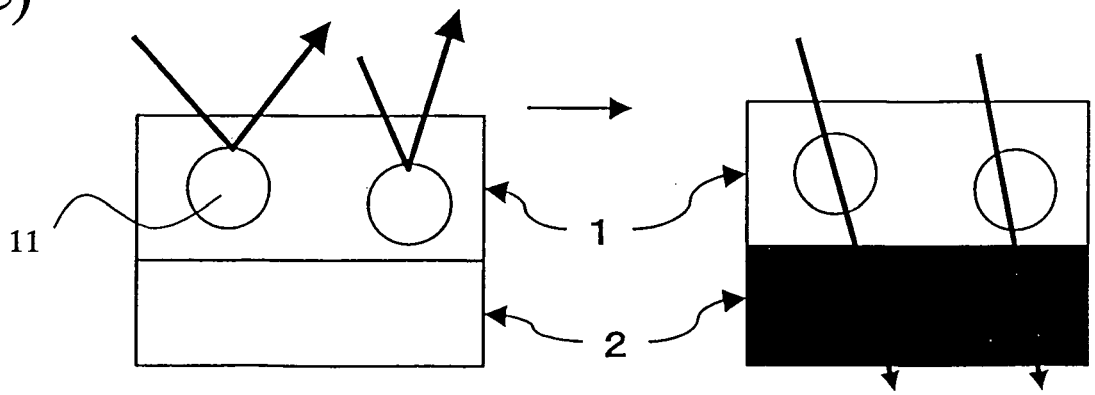

For the display device of the present embodiment, when a voltage is applied to the electrodes 3a, 3b in such a manner that the conversion layer 2 is the positive side and the dimming layer 1 is the negative side, as shown in FIGS. 21(a) to (c), the light incident face of the display device changes from a metal (diffuse) reflection state to a black (light absorbing) state.

In the case where the dimming layer 1 is a film of dimming material, as shown in FIG. 21(a), the light incident face of the display device, which exhibited metallic reflection in an initial state, gradually changes to a black (light absorbing) state responsive to voltage application. This is because, as the dimming layer 1 becomes transparent, the black conversion layer 2 becomes visually perceivable.

Preferably, the dimming layer 1 diffuse-reflects light in a metallic reflection state, as shown in FIGS. 21(a) and (b). As shown in FIG. 21(b), if minute bumps are present on the surface of the dimming layer 1, the light incident face of the display device, which exhibited metal diffuse reflection in an initial state, gradually changes to a black (light absorbing) state responsive to voltage application. Moreover, as shown in FIG. 21(c), if the dimming layer 1 contains particles of dimming material (dimming microparticles), the light incident face of the display device, which exhibited metal diffuse reflection in an initial state, gradually changes to a black (light absorbing) state, responsive to voltage application. This is because, as the dimming microparticles contained in the dimming layer 1 become transparent, the black conversion layer 2 becomes visually perceivable.

In any of the cases of FIGS. 21(a) to (c), this state is retained even after power is terminated. On the other hand, if the electrode 3a and the electrode 3b are short-circuited, or if a voltage with an inverted polarity is applied to the electrodes 3a, 3b, the light incident-side face of the display device changes so as to exhibit metal (diffuse) luster.

Figure 22:
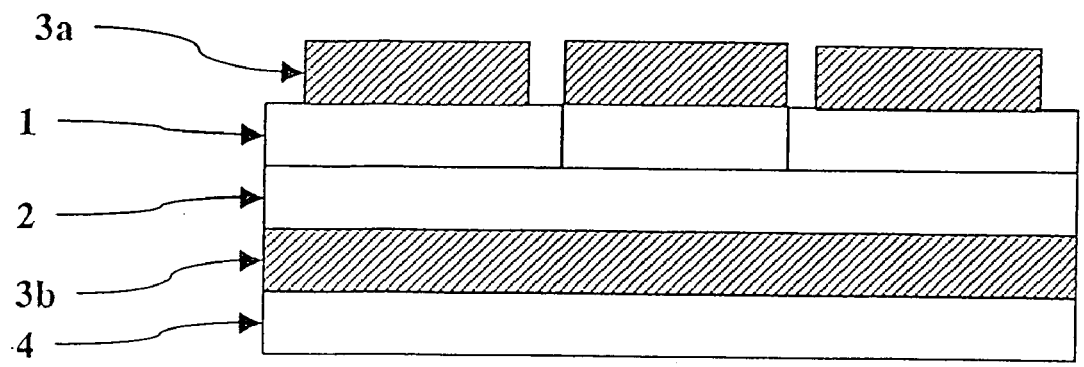
FIG. 22 is a cross-sectional view showing the nineteenth embodiment of the display device according to the present invention.

Note that, a display device including a dimming layer 1 which diffuse-reflects light in a metallic reflection state as shown in FIGS. 21(b) and (c) is able to display a bright, excellent white color. Such a display device may be a monochrome display device. FIG. 22 is a cross-sectional view showing a monochrome display device of the present embodiment. As shown in FIG. 22, the monochrome display device has a basic constitution similar to the constitution shown in FIG. 7 except that no color filters 6 are comprised.

According to the present embodiment, it is not necessary to separately provide a light absorbing layer, so that the production process can be made further simpler. Moreover, in a light absorbing state of Embodiment 18 described above, light entering the display device passes through the dimming layer 1, the conversion layer 2, and the electrodes 3b, thus to be absorbed by the light absorbing layer 5. On the other hand, in a light absorbing state of the present embodiment, light entering the display device is absorbed by the conversion layer 2 after passing only through the dimming layer 1, so that the reflected light occurring at the interfaces between layers and the like is reduced, and the quality of black display can be improved. As a result, the contrast ratio of the display is increased.

Embodiment 20

Next, with reference to FIG. 23, a twentieth embodiment of the display device according to the present invention will be described. The display device of the present embodiment has a similar constitution to that of the display device of Embodiment 18, but differs therefrom in the following aspects. In Embodiment 18, color filters 6 are comprised above the electrodes 3a; however, in the present embodiment, the conversion layer 2 has the function of color filters, and it is unnecessary to provide color filters on the electrodes 3a.

Figure 23:
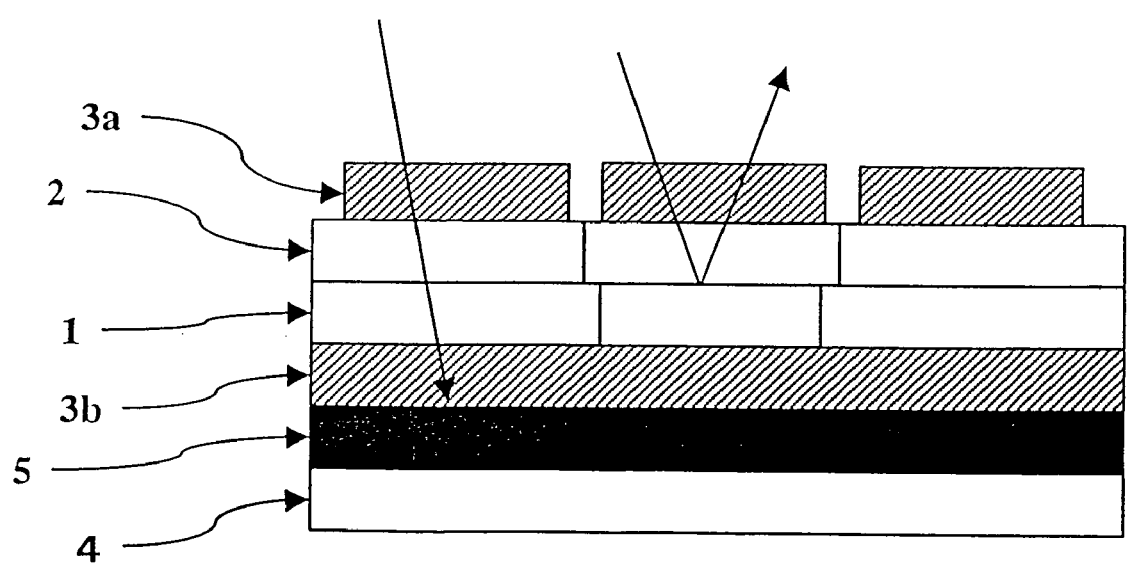
FIG. 23 is a cross-sectional view showing a twentieth embodiment of the display device according to the present invention.

In the constitution shown in FIG. 23, the dimming layer 1 is provided so as to be closer to the substrate 4, with the conversion layer 2 being formed thereupon. However, the conversion layer 2 may be provided so as to be closer to the substrate 4, with the dimming layer 1 being formed thereupon. If the substrate 4 is a transparent substrate such as a glass substrate, the light absorbing layer 5 may be provided on the rear face of the substrate 4.

A conversion layer 2 capable of functioning as color filters is formed as follows, for example. Coloring pigments of RGB are mixed in the same material as the material used for the transparent conversion layer 2 in Embodiment 18, thus preparing dispersed solutions of RGB. By an ink jet technique, these dispersed solutions are applied onto the dimming layer 1 so as to correspond to the pixel patterns. As a result, the conversion layer 2 is formed. Other than an ink jet technique, the application method may be any other known printing method such as a screen printing technique or a rolling press technique.

The display device of the present embodiment has similar display characteristics to those of Embodiment 18. According to the present embodiment, it is unnecessary to separately provide color filters, so that the production process can be simplified.

Embodiment 21

Figure 24:
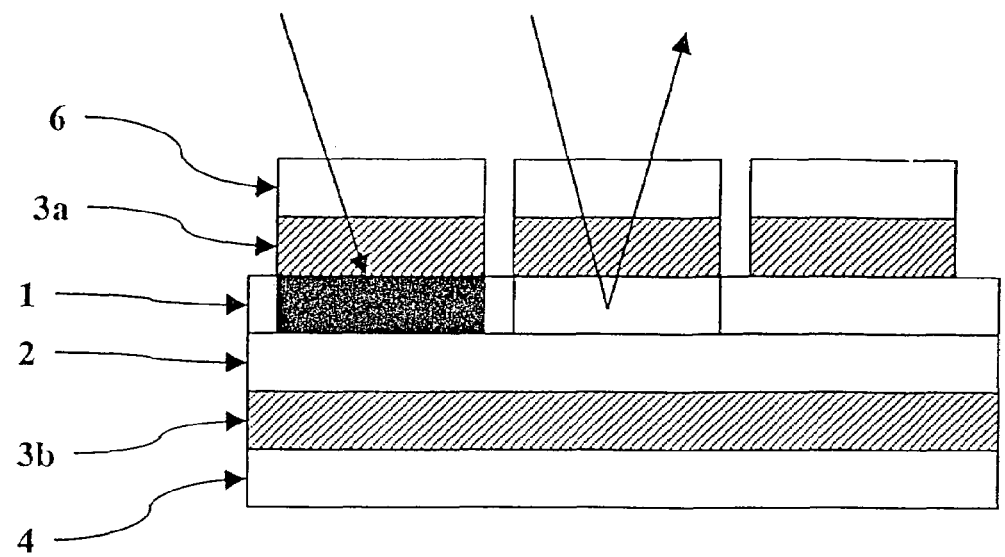
FIG. 24 is a cross-sectional view showing a twenty-first embodiment of the display device according to the present invention.

Next, with reference to FIG. 24, a twenty-first embodiment of the display device according to the present invention will be described. As described below, the dimming layer 1 of the display device of the present embodiment differs from the dimming layers 1 of the display devices of Embodiments 18 to 20. Otherwise, its constitution is similar to that of Embodiment 18. Without providing a light absorbing layer 5 as in the display device shown in FIG. 17, or using a conversion layer 2 having a light absorbing ability as in the display device shown in FIG. 20, the display device of the present embodiment is capable of switching between a metal diffuse reflection (white) state and a light absorbing (black or colored) state.

Figure 25:
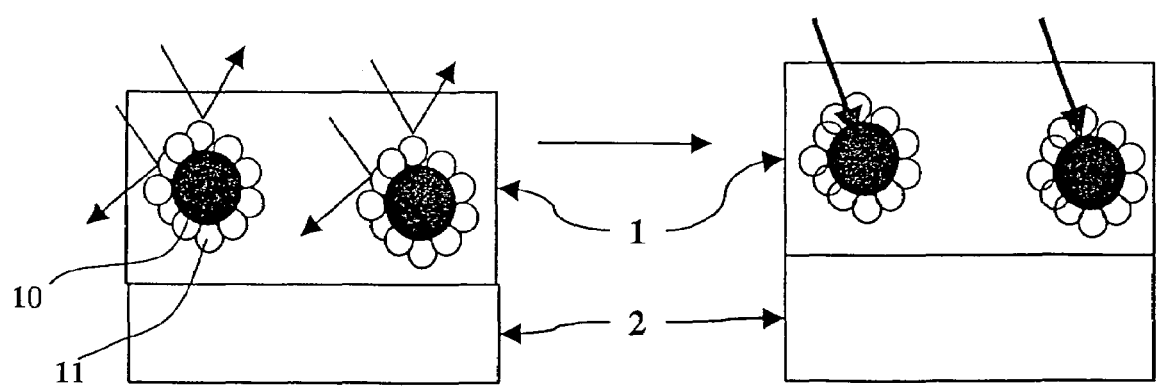
FIG. 25 is a cross-sectional view showing a dimming layer and a conversion layer in the twenty-first embodiment of the present invention.

FIG. 25 is a cross-sectional view showing the dimming layer 1 and the conversion layer 2 in the display device of the present embodiment. As shown in FIG. 25, the dimming layer 1 contains dimming microparticles (e.g., yttrium microparticles) 11 similar to the dimming microparticles contained in the dimming layer 1 of FIG. 1(c). The dimming microparticles 11 are adsorbed to colored particles 10 such as carbon-type black particles. In order to surely allow the dimming microparticles 11 to be adsorbed to the surface of the colored particles 10, it is preferable that the grain size of the dimming particles 11 is smaller than the grain size of the colored particles 10.

Such a dimming layer 1 can be formed as follows, for example. In a solution of binder resin, black particles having a grain size of 5 μm and dimming microparticles having a smaller grain size (e.g., 1 μm) are mixed, and dimming microparticles are allowed to adsorb so as to cover the surface of the black particles. After a conductive polymer material P2 is further blended to the resultant solution, the resultant blend solution is applied onto the electrode 3b by a spin coating technique. The thickness of the resultant dimming layer 1 is 10 μm, for example. Since the black particles are dispersed, the thickness of the dimming layer 1 is greater than the thickness of the dimming layer 1 in any other embodiment. However, since the carbon-type black microparticles and the dimming microparticles both exhibit a high conductivity, the entire dimming layer 1 has a sufficient conductivity.

For the display device of the present embodiment, when a voltage is applied to the electrodes 3a, 3b in such a manner that the conversion layer 2 is the positive side and the dimming layer 1 is the negative side, the light incident face of the display device, which exhibited metal diffuse reflection in an initial state, gradually changes to a black state, as shown in FIG. 25. This is because, as the dimming microparticles adsorbed to the black particles become transparent, the black particles become visually perceivable. This state is retained even after power is terminated. On the other hand, if the electrode 3a and the electrode 3b are short-circuited, or if a voltage with an inverted polarity is applied to the electrodes 3a, 3b, the light incident-side face of the display device changes so as to exhibit metal diffuse luster.

In the present embodiment, the conversion layer 2 does not need to be transparent or black. Therefore, a broader selection of materials can be used for the conversion layer 2. Moreover, since the electrodes 3b do not need to be transparent, the electrodes 3b may be metal electrodes.

The display device of the present embodiment has similar display characteristics to those of the display device of Embodiment 18.

In accordance with the display device of the present embodiment, when the dimming microparticles contained in the dimming layer 1 are in a metallic reflection state, reflected light is scattered so as to be perceived as white, whereby the surface of the dimming layer 1 appears white. On the other hand, when the dimming microparticles are in a transparent state, light is absorbed by the colored particles such as black particles, so that the surface of the dimming layer 1 appears black or in any other color. Thus, the dimming layer 1 itself transitions between a metal diffuse state and a light absorbing (colored) state. Therefore, in the present embodiment, it is unnecessary to separately provide a layer having a light absorbing ability, e.g., a light absorbing layer, so that the production process can be simplified.

Embodiment 22

Figure 26:
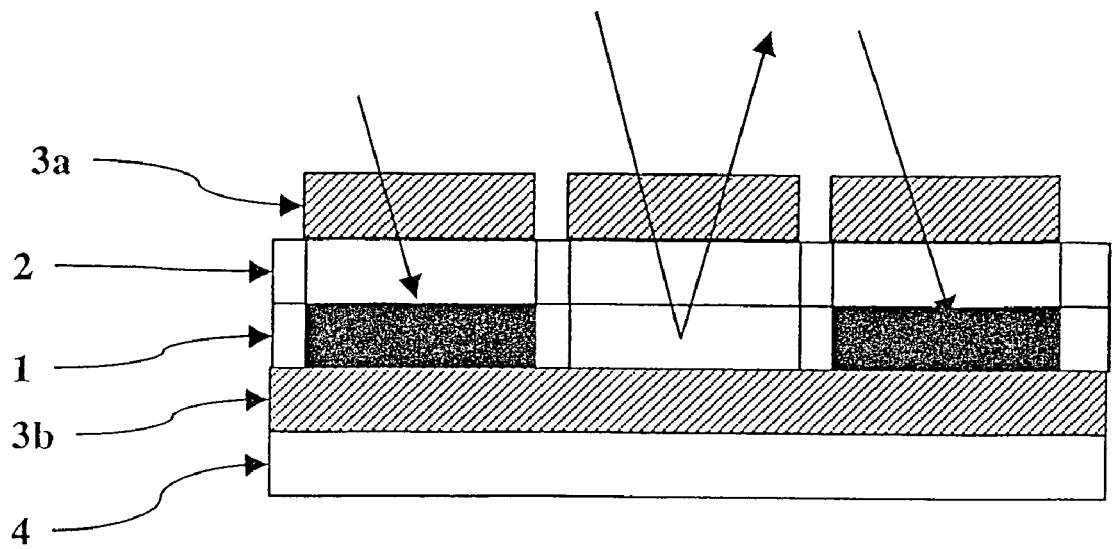
FIG. 26 is a cross-sectional view showing a twenty-second embodiment of the display device according to the present invention.

With reference to FIG. 26, a twenty-second embodiment of the display device according to the present invention will be described.

The display device of the present embodiment has a similar constitution to that of Embodiment 21, but differs therefrom in that the conversion layer 2 has the function of color filters, as shown in FIG. 26.

The dimming layer 1 is similar to the dimming layer 1 of Embodiment 21. In other words, it contains dimming microparticles, the dimming microparticles being adsorbed to black particles. The dimming layer 1 can be formed by a similar method to the method of forming the dimming layer 1 in Embodiment 21.

The conversion layer 2 having the function of color filters is similar to the conversion layer 2 of Embodiment 20, for example. The conversion layer 2 can be formed, on the dimming layer 1, by a similar method to the method of forming the conversion layer 2 of Embodiment 20.

According to the present embodiment, since the dimming layer 1 has a light absorbing ability, it is unnecessary to separately form a layer having a light absorbing ability, e.g., light absorbing layer. Moreover, since the conversion layer 2 functions also as color filters, it is unnecessary to separately provide color filters, so that the production process can be greatly simplified. Furthermore, since the number of layers through which incident light or reflected light passes is reduced, the light absorption in a white state and the light reflection in a black state are reduced as compared to the display device of Embodiment 18, whereby the contrast ratio of the display is improved.

Embodiment 23

Figure 27:
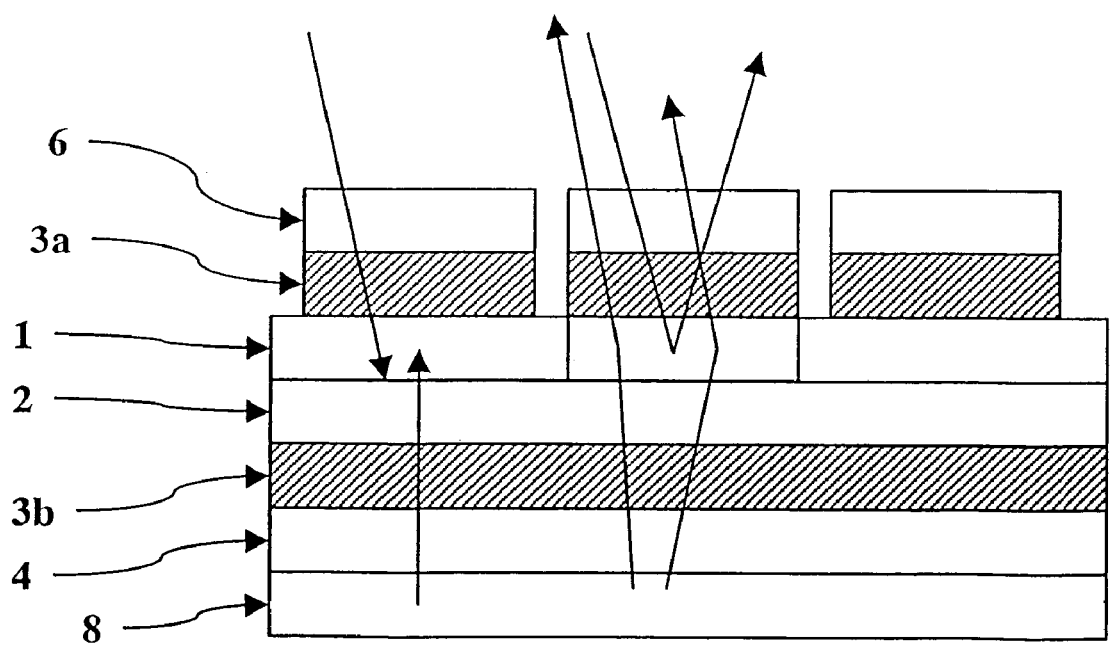
FIG. 27 is a cross-sectional view showing a twenty-third embodiment of the display device according to the present invention.

With reference to FIG. 27, a twenty-third embodiment of the display device according to the present invention will be described.

The display device of the present embodiment has a similar constitution to that of Embodiment 21, but differs therefrom in that a backlight 8 is disposed on the rear face of the substrate 4, as shown in FIG. 27. By turning ON/OFF the backlight 8, the display device of the present embodiment is able to switch between a transmission type display device and a reflection type display device.

The conversion layer 2 is transparent, and is similar to the conversion layer 2 of Embodiment 18, for example. The conversion layer 2 can be formed, on the electrodes 3b, by a similar method to the method of forming the conversion layer 2 in Embodiment 18.

The dimming layer 1 of the display device of the present embodiment is similar to the dimming layer 1 of Embodiment 21. In other words, it contains dimming microparticles, the dimming microparticles being adsorbed to black particles. The dimming layer 1 can be formed, on the conversion layer 2, by a similar method to the method of forming the dimming layer 1 in Embodiment 21.

The layering order of the conversion layer 2 and the dimming layer 1 with respect to the substrate 4 is not limited to that which is illustrated in the figure, but the dimming layer 1 may be disposed so as to be closer to the substrate 4, with the conversion layer 2 being formed thereupon. In this case, the conversion layer 2 can have the function of color filters. Such a conversion layer 2 is similar to the conversion layer 2 of Embodiment 5, for example. Adopting such a constitution is advantageous in that the color filters 6 can be eliminated.

In the present embodiment, the electrodes 3a, 3b and the substrate 4 are transparent. For example, the electrodes 3a, 3b are ITO electrodes, whereas the substrate 4 is a glass substrate.

The backlight 8 may be a known backlight which is used for a liquid crystal display apparatus or the like.

The display device of the present embodiment can be used as a reflection type display device when there is external light. In other words, when sufficient light enters from above the substrate 4, a display based on reflected light can be performed similarly to Embodiment 4. On the other hand, when it is difficult to be used as a reflection type display device because there is little external light, it can be used as a transmission type display device by activating the backlight 8. The light which enters the dimming layer 1 from the backlight 8 is absorbed by the dimming layer 1 if the dimming layer 1 of that pixel is in a light absorbing (black) state, as a result of which the pixel displays black. If the dimming layer 1 of that pixel changes to a metal diffuse reflection state, the light entering the dimming layer 1 from the backlight 8 is scattered by the dimming microparticles in the dimming layer 1. The scattered light can be taken out from above the substrate 4. Therefore, the pixel displays white.

Thus, according to the present embodiment, a display device which provides good visual recognition in a multitude of scenes can be realized because it can be used as a display device of either a transmission type or a reflection type, in accordance with the circumstances of external light.

Embodiment 24

With reference to FIGS. 28(a) and (b), a twenty-fourth embodiment of the display device according to the present invention will be described. The display device of the present embodiment has a similar constitution to that of Embodiment 23, but differs therefrom in the following aspects. In Embodiment 23, a film containing dimming particles adsorbed to colored particles is used as the dimming layer 1; however, in the present embodiment, a film of dimming material is used as the dimming layer 1. By turning the backlight 8 ON/OFF, the display device of the present embodiment is able to switch between a transmission type display device ↔a reflection type display device.

Figure 28:
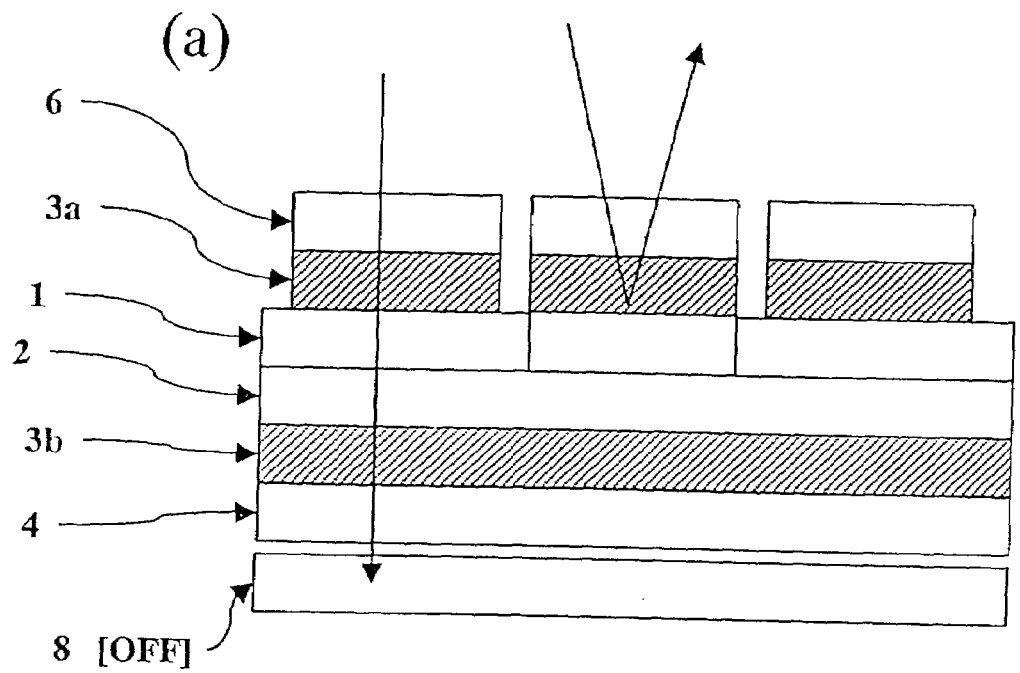
FIGS. 28(a) and (b) are cross-sectional views showing a twenty-fourth embodiment of the display device according to the present invention.
Figure 28:
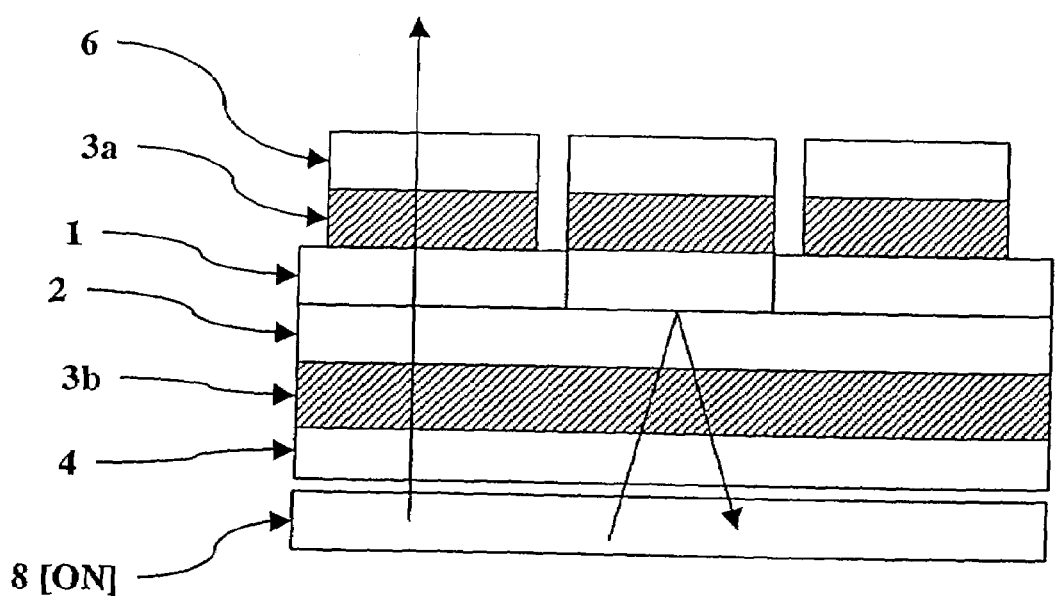

The dimming layer 1 of the display device shown in FIGS. 28(*a*) and (*b*) may be any dimming layer that mirror-reflects light in a metallic reflection state. For example, it may be a metal film, e.g., a yttrium film, shown in FIG. 1(*a*). This metal film is typically substantially flat.

The display device of the present embodiment can be used as a reflection type display device when there is external light, as shown in FIG. 28(*a*). In other words, when sufficient light enters from above the substrate 4, a display based on reflected light can be performed similarly to Embodiment 23. If the dimming layer 1 of a pixel is in a state of transmitting light, the incident light passes through the dimming layer 1 and other layers to be absorbed by the non-activated backlight 8 located on the rear face of the transparent substrate 4, so that this pixel displays black. If the dimming layer 1 of a pixel is in a state of reflecting light, the incident light is reflected by the dimming layer 1, so that this pixel displays white. On the other hand, when it is difficult to be used as a reflection type display device because there is little external light, it can be used as a transmission type display device by activating the backlight 8, as shown in FIG. 28(*b*). The light which enters the dimming layer 1 from the backlight 8 is reflected by the dimming layer 1 and returned to the backlight 8 if the dimming layer 1 of that pixel is in a mirror-reflection state, as a result of which the pixel displays black. If the dimming layer 1 of the pixel changes to a state of transmitting light, the light entering the dimming layer 1 from the backlight 8 can be intactly taken out from above the substrate 4. Therefore, the pixel displays white.

In the present embodiment, as described above, the states of the dimming layer 1 in a displaying pixel and a non-displaying pixel differ depending on whether it is used as a reflection type display device or a transmission type display device. Therefore, it is preferable to invert the state of the dimming layer 1 of each pixel in accordance with the switching between a reflection type display device and a transmission type display device.

Note that the layering order of the conversion layer 2 and the dimming layer 1 with respect to the substrate may be reversed from the illustrated example.

Thus, according to the present embodiment, a display device which provides good visual recognition in a multitude of scenes can be realized because it can be used as a display device of either a transmission type or a reflection type, in accordance with the circumstances of external light.

Embodiment 25

Figure 29:
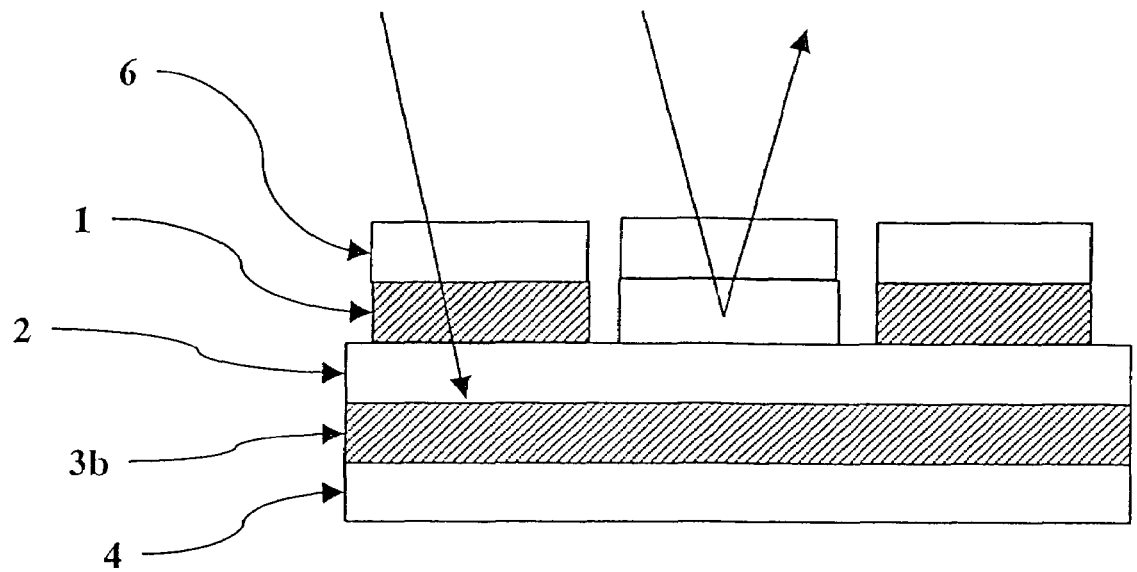
FIG. 29 is a cross-sectional view showing a twenty-fifth embodiment of the display device according to the present invention.

With reference to FIG. 29, a twenty-fifth embodiment of the display device according to the present invention will be described. The display device of the present embodiment differs from the display devices of the other embodiments in that, as shown in FIG. 25, the dimming layer 1 itself doubles as one of the electrodes.

Figure 13:
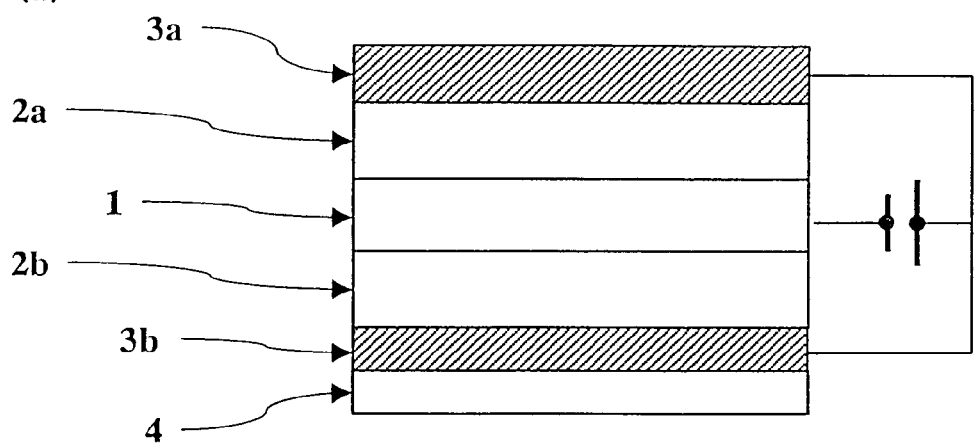
FIGS. 13(a) and (b) are cross-sectional views showing a thirteenth embodiment of the dimming device according to the present invention.
Figure 13:
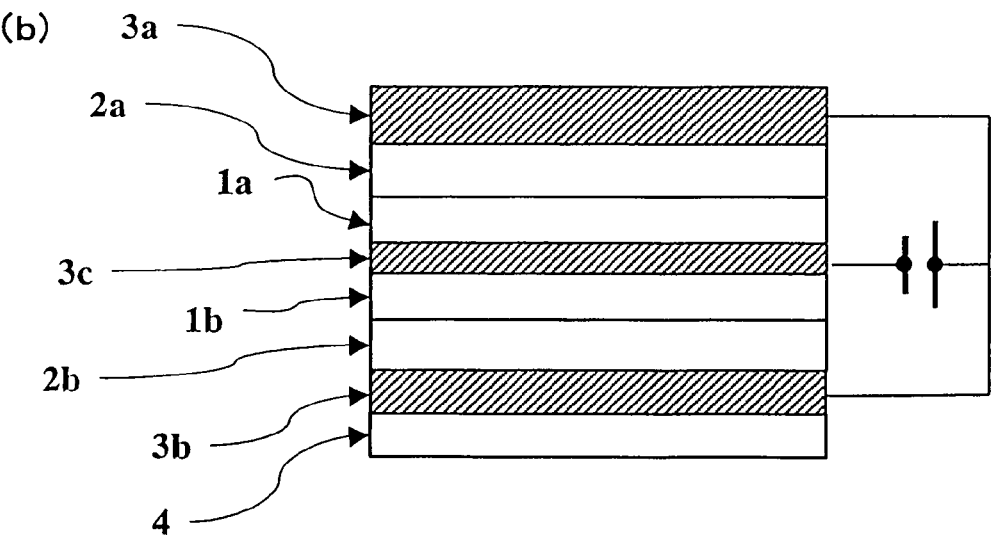

In the case where the dimming layer 1 is a metal film such as a yttrium film, the dimming layer 1 can function as electrodes. Even in the case where the dimming layer 1 is a film containing particles of dimming material (dimming microparticles), as long as the binder resin in the dimming layer 1 contains a conductive material, the dimming layer 1 can be used as electrodes. If the dimming layer 1 is disposed on the side of the conversion layer 2 closer to the substrate 4, the dimming layer 1 can be allowed to function as electrodes 3*b*. Alternatively, if the dimming layer 1 is disposed on the conversion layer 2 as shown in FIG. 13, the dimming layer 1 can be allowed to function as electrodes 3*a*.

In order to allow the dimming layer 1 to function as electrodes, it is necessary to pattern a film which is formed from a dimming material. As the dimming material, a material similar to the dimming material used in Embodiment 1 can be used. In the present embodiment, the dimming layer 1 is formed as follows. First, a metal film is formed on the conversion layer 2 by a sputtering technique or the like. This metal film is patterned through a patterning using mask vapor deposition, a wet or dry patterning process, or the like. As a result, the dimming layer 1 is obtained. The dimming layer 1 has sufficient conductivity for functioning as electrodes.

Alternatively, a dimming layer 1 containing dimming microparticles may be formed. In this case, a solution containing necessary materials, such as a binder resin, dimming microparticles, and a conductive material, is prepared, and this solution is applied on the conversion layer 2 by using a known printing technique, whereby a patterned dimming layer 1 can be formed.

In the present embodiment, as the conversion layer 2, a conversion layer 2 having a similar light absorbing ability to that of the conversion layer 2 of Embodiment 19 is used. Alternatively, a transparent conversion layer 2 similar to the conversion layer 2 of Embodiment 18 may be used. In that case, it would do well to dispose a light absorbing layer 5 somewhere between the dimming layer 1 and the substrate 4.

Figure 30:
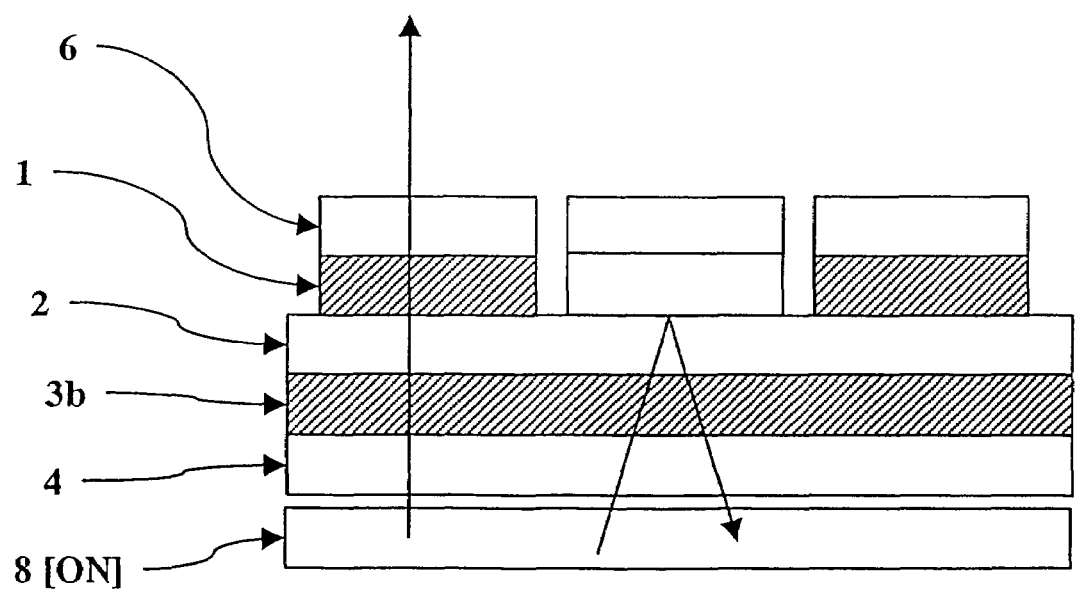
FIG. 30 is a cross-sectional view showing a twenty-fifth embodiment of the display device according to the present invention.

The display device of the present embodiment is not limited to a display device of the constitution shown in FIG. 29. Alternatively, in a display device of any of the other embodiments described above, the dimming layer 1 may be allowed to function as one of the electrodes. For example, in the transmission type display device shown in FIG. 27, the dimming layer 1 may be allowed to function as electrodes, without providing the electrodes 3*a* (FIG. 30).

According to the present embodiment, since the dimming layer 1 doubles as electrode, the number of production steps for the display device can be reduced.

In accordance with a dimming device of the present invention, dimming can be performed in response to externally-supplied electrical or optical stimulations, so that it is unnecessary to control the concentration or pressure of a specific element, such as hydrogen, contained in the atmosphere gas. Therefore, it is possible to provide inexpensive dimming glass or the like with a simple constitution.

Moreover, according to the present invention, by comprising a dimming layer which contains particles of a material which is capable of transitioning between a metallic luster state and a transparent state, it becomes possible to provide a dimming device which can switch the optical characteristics of the dimming layer more rapidly, and which is applicable to a broader range of purposes.

The dimming device according to the present invention can transition between a state of diffuse-reflecting light and a state of transmitting or absorbing light, and has a high memory ability. Therefore, it would be particularly advantageous if the dimming device according to the present invention is applied to various types of display apparatuses.

Furthermore, according to the present invention, a display device can be provided by using a material, which is capable of transitioning between a metallic reflection state and a transmitting state. The display device of the present invention does not include polarizer plates as does a liquid crystal display device, and therefore is able to realize a high-brightness and high-contrast ratio display.

The display device according to the present invention is applicable to various types of active matrix driving or simple matrix driving display apparatuses (including full-color or monochrome display apparatuses). Moreover, the display device according to the present invention is applicable to a display apparatus of either a reflection type, a transmission type, or a projection type. Particularly, using the display device according to the present invention is advantageous because a display apparatus which can function as either a reflection type display apparatus or a transmission type display apparatus can be constructed. Moreover, the display device according to the present invention has a high memory ability, and therefore is applicable to electronic books and electronic paper.

The invention claimed is:

1. A dimming device comprising a layered structure including a first layer and a second layer, such that a light reflectance of the first layer changes in response to an external stimulation, wherein,
   the first layer contains a first material whose optical characteristics change in accordance with a concentration of a specific element, and
   the second layer contains a second material capable of containing the specific element, the second material releasing or absorbing the specific element in accordance with the external stimulation.

2. The dimming device of claim 1, wherein the element is hydrogen, and the first material is able to transition between a light reflecting state and a light transmitting state in accordance with a hydrogen concentration.

3. The dimming device of claim 2, wherein the first layer diffuse-reflects light when the first material is in the light reflecting state.

4. The dimming device of claim 3, wherein the first material is particles.

5. The dimming device of claim 4, wherein a diameter of the particles is equal to or greater than 350 nm and equal to or less than a thickness of the first layer.

6. The dimming device of claim 4, wherein the first layer contains colored particles having a visible light absorbing ability, the particles being adsorbed to the colored particles.

7. The dimming device of claim 2, wherein the second layer contains a hydrogen storage material.

8. The dimming device of claim 7 operating in a region where respective hydrogen equilibrium pressure-composition isotherms (PTC characteristic curves) of the first layer and the second layer are substantially flat.

9. The dimming device of claim 8, wherein, in the region where the PTC characteristic curves are substantially flat, hydrogen equilibrium pressures of the first layer and the second layer are about the same.

10. The dimming device of claim 9, wherein a range of hydrogen storage amount of the second layer in the region where the PTC characteristic curve is substantially flat encompasses a range of hydrogen storage amount of the first layer in the region where the PTC characteristic curve is substantially flat.

11. The dimming device of claim 1, wherein the second material releases or absorbs the specific element through exchanges of electrons.

12. The dimming device of claim 1, wherein the second material releases or absorbs the specific element in response to light irradiation.

13. The dimming device of claim 12, wherein the second layer contains a material having a photocatalytic ability.

14. The dimming device of claim 1, comprising a pair of conductive layers for forming an electric field for causing ions of the specific element to move from the second material to the first material, or from the first material to the second material.

15. The dimming device of claim 14, wherein the first and second layers are positioned between the pair of conductive layers.

16. The dimming device of claim 14, wherein the first layer has conductivity, and functions as one of the pair of conductive layers.

17. The dimming device of claim 14, wherein the second layer has conductivity, and functions as one of the pair of conductive layers.

18. The dimming device of claim 1, wherein the second layer requires a light transmitting ability.

19. The dimming device of claim 18, wherein at least one of an upper face and a lower face of the first layer has bumps and dents, and the first layer transitions between a state of diffuse-reflecting light and a state of transmitting light, further comprising a light absorbing layer for absorbing light having been transmitted through the first layer.

20. The dimming device of claim 1, wherein the second layer requires a visible light absorbing ability.

21. The dimming device of claim 20, wherein at least one of an upper face and a lower face of the first layer has bumps and dents, and the first layer transitions between a state of diffuse-reflecting light and a state of transmitting light, and
   the second layer is disposed opposite from a light incident face of the first layer.

22. The dimming device of claim 1, wherein at least one of the first layer and the second layer has a multi-layer structure.

23. A dimming device comprising a dimming layer whose light reflectance changes in response to an external stimulation, wherein,
   the dimming layer contains a first material whose optical characteristics change in accordance with a concentration of a specific element, the first material being particles.

24. The dimming device of claim 23, wherein the first material is able to transition between a light reflecting state and a light transmitting state in accordance with the concentration of the specific element.

25. The dimming device of claim 24, wherein the dimming layer diffuse-reflects light when the first material is in the light reflecting state.

26. The dimming device of claim 23, wherein a diameter of the particles is equal to or greater than 350 nm and equal to or less than a thickness of the dimming layer.

27. The dimming device of claim 23, wherein the dimming layer contains colored particles having a visible light absorbing ability, the particles being adsorbed to the colored particles.

28. The dimming device of claim 23, wherein the specific element is hydrogen.

29. A dimming device comprising a dimming layer whose light reflectance changes in response to an external stimulation, wherein the dimming layer
   contains a first material whose optical characteristics change in accordance with a concentration of a specific element, and
   contains a second material capable of containing the specific element, the second material releasing or absorbing the specific element in accordance with the external stimulation, wherein
   the first material is particles.

30. A display device including a plurality of pixels, each of the plurality of pixels having:
- a first layer containing a first material whose optical characteristics change in accordance with a concentration of a specific element;
- a second layer containing a second material capable of containing the specific element, the second material releasing or absorbing the specific element upon application of a voltage; and
- a pair of electrodes for applying the voltage to the second layer,
- wherein a light reflectance of the first layer changes in response to the voltage.

31. The display device of claim 30, wherein the first material is able to transition between a light reflecting state and a light transmitting state in accordance with the concentration of the specific element.

32. The display device of claim 31, wherein the first layer diffuse-reflects light when the first material is in a light reflecting state.

33. The display device of claim 32, wherein the first material is particles.

34. The display device of claim 33, wherein the first layer further contains colored particles, the first material being adsorbed to the colored particles.

35. The display device of claim 34 further comprising a backlight.

36. The display device of claim 32, wherein at least one of an upper face and a lower face of the first layer has bumps and dents.

37. The display device of claim 32, wherein the first layer transitions between a state of diffuse-reflecting light and a state of transmitting light, and the second layer requires a light transmitting ability,
- further comprising a light absorbing layer for absorbing light having been transmitted through the first layer and the second layer.

38. The display device of claim 32, wherein the first layer transitions between a state of diffuse-reflecting light and a state of transmitting light, the second layer having a visible light absorbing ability, and
- the second layer is disposed opposite from a light incident face of the first layer.

39. The display device of claim 30, wherein the second layer is disposed on a light incident side of the first layer, and functions as a color filter.

40. The display device of claim 30, wherein the specific element is hydrogen, and the second layer contains a hydrogen storage material.

41. The display device of claim 30, wherein the second material releases or absorbs the specific element through exchanges of electrons.

42. The display device of claim 30, wherein the first layer has conductivity, and functions as one of the pair of electrodes.

43. The display device of claim 30 which is a reflection type display device.

44. The display device of claim 30, wherein the first layer transitions between a state of mirror-reflecting light and a state of transmitting light, further comprising a backlight.

* * * * *

UNITED STATES PATENT AND TRADEMARK OFFICE
CERTIFICATE OF CORRECTION

PATENT NO. : 7,405,864 B2
APPLICATION NO. : 10/549503
DATED : July 29, 2008
INVENTOR(S) : Hideki Uchida Page 1 of 1

It is certified that error appears in the above-identified patent and that said Letters Patent is hereby corrected as shown below:

On the Title page of the Letters patent, the second line, right column should be:

(45) Date of Patent: *Jul. 29, 2008

On the Title page, before item [21], please insert the following:

This patent is subject to a terminal disclaimer.

Signed and Sealed this

Twenty-eighth Day of October, 2008

JON W. DUDAS
*Director of the United States Patent and Trademark Office*